(12) United States Patent
Asakura et al.

(10) Patent No.: US 10,507,865 B2
(45) Date of Patent: Dec. 17, 2019

(54) STEERING APPARATUS

(71) Applicant: JTEKT CORPORATION, Osaka-shi, Osaka (JP)

(72) Inventors: Masayoshi Asakura, Okazaki (JP); Kiyoshi Uchiyama, Nukata-gun (JP); Hirotsune Suzuki, Toyokawa (JP); Shunji Inoue, Toyokawa (JP); Hirokazu Kondo, Toyoake (JP)

(73) Assignee: JTEKT CORPORATION, Osaka (JP)

( * ) Notice: Subject to any disclaimer, the term of this patent is extended or adjusted under 35 U.S.C. 154(b) by 309 days.

(21) Appl. No.: 15/451,919

(22) Filed: Mar. 7, 2017

(65) Prior Publication Data

US 2017/0259844 A1 Sep. 14, 2017

(30) Foreign Application Priority Data

Mar. 9, 2016 (JP) .................. 2016-045967
Mar. 9, 2016 (JP) .................. 2016-045968
Mar. 9, 2016 (JP) .................. 2016-045969

(51) Int. Cl.
*F16H 25/22* (2006.01)
*B62D 5/04* (2006.01)
(Continued)

(52) U.S. Cl.
CPC ......... *B62D 5/0424* (2013.01); *B62D 5/0448* (2013.01); *F16H 7/023* (2013.01);
(Continued)

(58) Field of Classification Search
CPC .................................................. F16C 33/3713
See application file for complete search history.

(56) References Cited

U.S. PATENT DOCUMENTS 2,298,011 A * 10/1942 Hoffar ................ F16C 33/3713
74/424.87
4,221,137 A * 9/1980 Futaba .................... B62D 3/08
74/216.3
(Continued)

FOREIGN PATENT DOCUMENTS

DE         4235842 A1    4/1994
DE    102007049832 A1    4/2009
(Continued)

OTHER PUBLICATIONS

Jul. 6, 2017 Extended Search Report issued in European Patent Application No. 17159780.0.

*Primary Examiner* — Jacob D Knutson
(74) *Attorney, Agent, or Firm* — Oliff PLC

(57) ABSTRACT

A steering apparatus includes a steering shaft; a steered shaft; a ball screw mechanism; and a motor. A plurality of rolling elements includes large-diameter rolling elements and small-diameter rolling elements. A prescribed diameter difference is set such that when a magnitude of power transmitted between a first screw groove and a second screw groove is a prescribed value or less, only the large-diameter rolling elements transmit the power between the first screw groove and the second screw groove, and when the magnitude of the power transmitted between the first screw groove and the second screw groove exceeds the prescribed value, both the large-diameter rolling elements and the small-diameter rolling elements transmit the power.

8 Claims, 16 Drawing Sheets

(51) Int. Cl.
    *F16H 7/02*     (2006.01)
    *F16H 9/26*     (2006.01)
    *B62D 3/12*     (2006.01)
    *F16H 25/20*     (2006.01)

(52) U.S. Cl.
    CPC ........... *F16H 9/26* (2013.01); *F16H 25/2214* (2013.01); *B62D 3/12* (2013.01); *F16H 2025/2081* (2013.01); *F16H 2025/2096* (2013.01)

(56) References Cited

U.S. PATENT DOCUMENTS

| | | | | |
|---|---|---|---|---|
| 4,593,780 | A | * | 6/1986 | Saito ................ B62D 3/12 180/444 |
| 5,467,662 | A | * | 11/1995 | Lange ................ F16C 19/505 74/424.83 |
| 5,749,265 | A | * | 5/1998 | Namimatsu ......... F16H 25/2204 74/424.75 |
| 2007/0006676 | A1 | * | 1/2007 | Mizuhara ............ B62D 5/0448 74/424.86 |
| 2011/0296939 | A1 | * | 12/2011 | Kaneko ............... F16H 25/2214 74/424.87 |
| 2012/0298439 | A1 | * | 11/2012 | Ji ........................ B62D 5/0403 180/443 |
| 2014/0144263 | A1 | | 5/2014 | Yoshioka et al. |
| 2014/0353068 | A1 | * | 12/2014 | Yamamoto ........... B62D 5/0412 180/444 |
| 2017/0349205 | A1 | * | 12/2017 | Kaneko ................. F16H 7/02 |
| 2018/0022379 | A1 | * | 1/2018 | Sasaki ................... B62D 3/126 701/41 |

FOREIGN PATENT DOCUMENTS

| | | |
|---|---|---|
| EP | 0673827 A1 | 9/1995 |
| EP | 1319869 A1 | 6/2003 |
| EP | 2738066 A1 | 6/2014 |
| JP | S61-153051 A | 7/1986 |
| JP | 2011-105075 A | 6/2011 |
| JP | 2014-077459 A | 5/2014 |
| JP | 2014-105802 A | 6/2014 |
| JP | 2016-020725 A | 2/2016 |
| WO | 2004/013503 A1 | 2/2004 |

* cited by examiner

STEERING APPARATUS

INCORPORATION BY REFERENCE

The disclosure of Japanese Patent Applications No. 2016-045967 and 2016-045968, 2016-045969 filed on Mar. 9, 2016 each including the specification, drawings and abstract is incorporated herein by reference in its entirety.

BACKGROUND

1. Technical Field

The disclosure relates to a steering apparatus.

2. Description of Related Art

Conventionally, there is a steering apparatus for a vehicle (an automobile), the steering apparatus being configured to assist an operation of a rack shaft by generating an axial thrust of the rack shaft by an electric motor (see Japanese Patent Application Publication No. 2014-77459 (JP 2014-77459 A)). In the steering apparatus described in JP 2014-77459 A, a rolling element screw portion (a ball screw portion) is formed on an outer peripheral surface of the rack shaft. A rolling element nut (a ball nut) is threadedly engaged with the rolling element screw portion via a plurality of rolling elements (balls) having the same diameter so as to be engaged with a groove of the rolling element screw portion, thereby constituting a ball screw mechanism. In the ball screw mechanism, the rolling element nut is rotated around the rack shaft by a rotational force of the electric motor. Accordingly, the rolling element nut thus rotated moves the rack shaft in an axis direction via the plurality of rolling elements. The steering apparatus described in JP 2014-77459 A is a so-called rack-parallel steering apparatus configured to assist an operation of the rack shaft by generating an axial thrust for the rack shaft with the use of an electric motor configured to be separated from the rack shaft and having an output shaft provided in parallel with an axis of the rack shaft. In the steering apparatus described in JP 2014-77459 A, an external thread is formed on the outer peripheral surface of the rack shaft. An internal thread formed on an inner peripheral surface of the rolling element nut (the ball nut) is threadedly engaged with the external thread of the rack shaft via the plurality of rolling elements (balls) having the same diameter, thereby constituting the ball screw mechanism. The rolling element nut is formed in a cylindrical shape, and one end thereof is supported by a housing of the steering apparatus. Further, the other end of the rolling element nut is connected to the output shaft of the motor via a toothed belt, so as to be rotationally driven by the motor. Thus, the rolling element nut is rotated by the motor so as to move the rack shaft in the axis direction via the plurality of rolling elements.

Note that, in the ball screw mechanism described in JP 2014-77459 A, the diameter and the number of the plurality of rolling elements arranged and accommodated in the groove of the rolling element screw portion are set such that the rolling elements can be arranged with a prescribed interval between the rolling elements adjacent to each other in the groove. Therefore, when the rolling element nut rotates around the axis relative to the rolling element screw portion with which the rolling element is threadedly engaged, each of the rolling elements contacting a groove surface of a groove of the rolling element nut and a groove surface of a groove of the rolling element screw portion is rolled on the surfaces of the grooves at a constant speed in the same direction without contacting its adjacent rolling elements. Thus, it is possible to smoothly rotate the rolling element nut and the rolling element screw portion relative to each other with a low resistance.

Further, conventionally, there is a steering apparatus for a vehicle (an automobile), the steering apparatus being configured to assist an operation of a rack shaft by generating an axial thrust for the rack shaft with the use of an electric motor (see Japanese Patent Application Publication No. 2014-105802 (JP 2014-105802 A)). In the steering apparatus described in JP 2014-105802 A, a rolling element external thread portion is formed on an outer peripheral surface of the rack shaft. Further, a rolling element internal thread portion is formed on an inner peripheral surface of a rolling element nut. The rolling element external thread portion and the rolling element internal thread portion form a rolling element screw portion, and are threadedly engaged with each other via a plurality of rolling elements (balls) having the same diameter. Further, the rolling element internal thread portion is formed such that an internal thread diameter of its axial central part is smaller than an internal thread diameter of its axial end. It is described that this configuration prevents a decrease in durability due to an excessive load being applied to the rolling elements (balls) disposed in the axial end of the rolling element screw portion from the rack shaft that is bent when a large load is input into the rack shaft to cause a prescribed amount of bending in the rack shaft.

Note that, in a ball screw mechanism described in JP 2014-105802 A, the diameter and the number of the plurality of rolling elements arranged and accommodated in the groove of the rolling element screw portion are set such that the rolling elements can be arranged with a prescribed interval between the rolling elements adjacent to each other in the groove. Therefore, when the rolling element nut is rotated around the axis relative to the rolling element screw portion with which the rolling element nut is engaged, each of the rolling elements contacting a groove surface of a groove of the rolling element nut and a groove surface of a groove of the rolling element screw portion is rolled on the surfaces of the grooves at a constant speed in the same direction without contacting its adjacent rolling elements. Thus, it is possible to smoothly rotate the rolling element nut and the rolling element screw portion relative to each other with a low resistance.

SUMMARY

In the steering apparatus described in JP 2014-77459 A, when a driver repeats an operation in such a mode that a steering wheel is turned slightly right and left, for example, a gap between the rolling elements in a given part among the plurality of rolling elements (balls) arranged with the prescribed gap (interval) between adjacent rolling elements is reduced in the grooves of the rolling element screw portion (the ball screw portion) and the rolling element nut (the ball nut). This may cause a so-called ball clogging state in which adjacent rolling elements contact each other. In this state, when the adjacent rolling elements are to rotate in the same direction in accordance with the relative rotation between the rolling element screw portion and the rolling element nut, movements (rotations) in opposite directions occur at a contact part between the adjacent rolling elements. Accordingly, each of the rolling elements disturbs the rotation of its counterpart rolling element with which the rolling element makes contact.

Further, in the steering apparatus described in JP 2014-77459 A, a toothed belt is wound around the rolling element nut with a prescribed tensile force. Therefore, the rolling element nut is pulled by the tensile force of the toothed belt, and thus, a distance (gap) between the internal thread of the ball nut and the external thread of the rack shaft becomes uneven in a circumferential direction. As a result, a narrow part and a wide part are formed. Thus, the plurality of rolling elements disposed between the external thread and the internal thread is pushed toward the wide part of a passage from the narrow part of the passage. This may cause the ball clogging state in which adjacent rolling elements contact each other in the wide part of the passage. In this state, when the driver steers the steering wheel so as to move the rack shaft in the axis direction, the rolling elements contacting each other in the ball screw mechanism rotate in the same direction in accordance with the relative rotation between the rolling element screw portion and the rolling element nut, and thus, movements (rotations) in opposite directions occur at the contact part between the rolling elements. Accordingly, each of the rolling elements disturbs the rotation of its counterpart rolling element with which the rolling element makes contact.

This increases a force necessary to move the rack shaft in the axial direction, which may make the driver feel that the steering operation is heavy. Further, this may increase a load and power consumption of the electric motor that moves the rack shaft in the axis direction via the rolling elements and the rolling element screw portion by rotating the rolling element nut.

Further, in the steering apparatus described in JP 2014-105802 A, for the reason described above, both ends and the central part of the rolling element screw portion have different clearances (passage diameters) between the rolling element external thread portion and the rolling element internal thread portion, such that the both ends have a larger clearance (passage diameter). As a result, the plurality of rolling elements arranged and accommodated in the groove of the rolling element screw portion easily moves from the central part with a narrow clearance to the both ends with a wide clearance. Further, since the both ends have a large passage diameter, the plurality of rolling elements further easily moves downward in a gravitational direction at the both ends. This increases a density of the rolling elements particularly on a lower side of the both ends of the rolling element screw portion. This may cause the ball clogging state in which adjacent rolling elements contact each other.

In this state, when the driver steers the steering wheel so as to move the rack shaft in the axis direction, the rolling elements contacting each other in the ball screw mechanism rotate in the same direction in accordance with the relative rotation between the rolling element screw portion and the rolling element nut. Thus, movements (rotations) in opposite directions occur at the contact part between the rolling elements and friction occurs. Accordingly, each of the rolling elements disturbs the rotation of its counterpart rolling element with which the rolling element makes contact. This increases a force necessary to move the rack shaft in the axial direction, which may make the driver feel that the steering operation is heavy. Further, this may increase a load and power consumption of the electric motor that moves the rack shaft in the axis direction via the rolling elements and the rolling element screw portion by rotating the rolling element nut.

The disclosure provides a steering apparatus which has durability and which allows a rolling element screw portion and a rolling element nut to smoothly rotate relative to each other even if a gap between rolling elements arranged in respective grooves of the rolling element screw portion and the rolling element nut provided in a ball screw mechanism is reduced such that adjacent rolling elements contact each other.

An aspect of the disclosure relates to a steering apparatus including a steering shaft; a steered shaft supported by a housing so as to be slidable in an axis direction of the steered shaft and configured to reciprocate in the axis direction via a rack-and-pinion mechanism in accordance with a steering angle of the steering shaft so as to steer steered wheels; a ball screw mechanism including a rolling element screw portion having a first screw groove formed on an outer peripheral surface of the steered shaft, a rolling element nut having a second screw groove formed on an inner peripheral surface of the rolling element nut so as to correspond to the first screw groove, a connecting member including a connecting passage connected to both ends of a spiral raceway formed between the first screw groove and the second screw groove so as to form a circulation passage together with the spiral raceway, and a plurality of rolling elements arranged and accommodated in the circulation passage, the circulation passage being continuous; and a motor fixed to the housing so as to rotate the rolling element nut around an axis of the steered shaft. The plurality of rolling elements includes large-diameter rolling elements and small-diameter rolling elements having a diameter smaller than that of the large-diameter rolling elements by a prescribed diameter difference, each of the small-diameter rolling elements being disposed between the large-diameter rolling elements, and the prescribed diameter difference is set such that when a magnitude of power transmitted between the first screw groove and the second screw groove is a prescribed value or less, only the large-diameter rolling elements transmit the power between the first screw groove and the second screw groove in the spiral raceway, and when the magnitude of the power transmitted between the first screw groove and the second screw groove exceeds the prescribed value, both the large-diameter rolling elements and the small-diameter rolling elements transmit the power between the first screw groove and the second screw groove in the spiral raceway.

Thus, in the spiral raceway of the ball screw mechanism, the large-diameter rolling elements and the small-diameter rolling element are disposed, and each of the small-diameter rolling elements is disposed between the large-diameter rolling elements. Accordingly, in a case where a driver turns the steering wheel slightly right and left such that ball clogging occurs in the rolling elements and a gap between the plurality of rolling elements arranged in the spiral raceway is reduced, which brings the rolling element into contact with each other, a magnitude of a frictional force caused between the rolling elements thus contacting each other can be made smaller than a magnitude of a frictional force caused between the large-diameter rolling elements in a case where all the rolling elements are constituted by the large-diameter rolling elements.

That is, in the spiral raceway, the small-diameter rolling elements which have a diameter smaller than that of the large-diameter rolling elements by the prescribed diameter difference and which are rotatable without restriction from the spiral raceway are each disposed between the large-diameter rolling elements. Therefore, the small-diameter rolling element can rotate in a rotation direction opposite to a rotation direction of the large-diameter rolling element, due to the rotation of the large-diameter rolling element at least at a portion where the large-diameter rolling element contacts the small-diameter rolling element. Accordingly, at the contact portion between the large-diameter rolling element and the small-diameter rolling element, friction due to relative movement between the large-diameter rolling element and the small-diameter rolling element hardly occurs.

In the configuration, when the power transmitted between the first screw groove and the second screw groove constituting the spiral raceway is the prescribed value or less, the aforementioned state where the small-diameter rolling elements are rotatable is maintained. That is, only the large-diameter rolling elements contact the first screw groove and the second screw groove and transmit the power between the first screw groove and the second screw groove. Thus, it is possible to achieve the smooth relative rotation between the ball screw portion and the ball nut without disturbing the rotation of the large-diameter rolling elements with which the small-diameter rolling element makes contact.

Further, in a case where it is necessary to transmit power larger than the prescribed value between the first screw groove and the second screw groove constituting the spiral raceway, at least one member among the first screw groove, the second screw groove, and the large-diameter rolling elements that contact the first screw groove and the second screw groove is elastically deformed, and thus, a clearance between the first screw groove and the second screw groove is reduced. Thus, in the spiral raceway, the first screw groove and the second screw groove contact the small-diameter rolling elements, and accordingly, the power transmission between the first screw groove and the second screw groove can be performed by both of the large-diameter rolling elements and the small-diameter rolling elements. This improves durability of the rolling elements.

In the above-described aspect, the motor may include an output shaft offset from the steered shaft; the steering apparatus may further include a belt transmission mechanism including a toothed drive pulley provided on the output shaft so as to be rotatable integrally with the output shaft, a toothed driven pulley integrally provided on the rolling element nut, and a toothed belt that transmits a driving force between the drive pulley and the driven pulley; and a radial clearance in the spiral raceway may vary in a circumferential direction depending on a direction of a tensile force of the toothed belt.

In the steering apparatus configured as described above, the rolling element nut may be urged in a prescribed direction due to a tensile force of the toothed belt, and thus, unevenness may be caused. Accordingly, a radial clearance in the spiral raceway, that is, a clearance (gap) formed between the first screw groove and the second screw groove may become uneven. Thus, a narrow part and a wide part may be formed in a passage for the rolling elements in the spiral raceway. In this state, the rolling elements may be pushed from the narrow part of the passage toward the wide part of the passage, which may cause a ball clogging state where adjacent rolling elements contact each other in the wide part of the passage.

However, in the spiral raceway, the small-diameter rolling elements which have a diameter smaller than that of the large-diameter rolling elements by the prescribed diameter difference and which are rotatable without restriction from the spiral raceway are each disposed between the large-diameter rolling elements. Therefore, the small-diameter rolling element can rotate in a rotation direction opposite to a rotation direction of the large-diameter rolling element, due to the rotation of the large-diameter rolling element at least at a portion where the large-diameter rolling element contacts the small-diameter rolling element. Accordingly, at the contact portion between the large-diameter rolling element and the small-diameter rolling element, friction due to relative movement between the large-diameter rolling element and the small-diameter rolling element hardly occurs.

In the configuration, when the power transmitted between the first screw groove and the second screw groove constituting the spiral raceway is the prescribed value or less, the aforementioned state where the small-diameter rolling elements are freely rotatable is maintained. That is, only the large-diameter rolling elements contact the first screw groove and the second screw groove and transmit the power between the first screw groove and the second screw groove. Thus, it is possible to achieve the smooth relative rotation between the ball screw portion and the ball nut without disturbing the rotation of the large-diameter rolling elements with which the small-diameter rolling element makes contact. Accordingly, the steering load of the steering shaft does not increase.

Further, when the power transmitted between the first screw groove and the second screw groove constituting the spiral raceway is larger than the prescribed value, at least one member among the first screw groove, the second screw groove, and the large-diameter rolling elements that contact the first screw groove and the second screw groove is elastically deformed, and thus, a clearance between the first screw groove and the second screw groove is reduced. Thus, in the spiral raceway, the first screw groove and the second screw groove contact the small-diameter rolling elements, and accordingly, the power transmission between the first screw groove and the second screw groove can be performed by both of the large-diameter rolling elements and the small-diameter rolling elements. This improves durability of the rolling elements.

In the above-described aspect, a pitch circle inside diameter of the second screw groove of the rolling element nut may be larger at an end of the rolling element nut in the axis direction than at a central part of the rolling element nut in the axis direction.

In the above-described configuration, the pitch circle inside diameter of the second screw groove of the rolling element nut is larger at the end of the rolling element nut in the axis direction than at the central part of the rolling element nut in the axis direction. Thus, the radial clearance between the first screw groove and the second screw groove is narrow at the central part and is wide at the both ends. Thus, the plurality of rolling elements arranged and accommodated in the second screw groove of the rolling element nut easily moves from the central part where the radial clearance between the first screw groove and the second screw groove is narrow toward the both ends where the radial clearance is wide. Further, since the radial clearance between the second screw groove and the first screw groove is wide at the both ends in the second screw groove, the plurality of rolling elements further easily falls downward in a gravitational direction at the both ends. This increases a density of the rolling elements on the lower side at the both ends in the second screw groove, which may cause a so-called ball clogging state in which adjacent rolling elements contact each other.

However, in the spiral raceway, the small-diameter rolling elements which have a diameter smaller than that of the large-diameter rolling elements by the prescribed diameter difference and which are rotatable without restriction from the first screw groove and the second screw groove (i.e., the spiral raceway) are each disposed between the large-diameter rolling elements. Therefore, in a case where the steered shaft is to move in the axis direction in the ball clogging state, the small-diameter rolling element can rotate in a rotation direction opposite to a rotation direction of the large-diameter rolling element, due to the rotation of the large-diameter rolling element at least at a portion where the large-diameter rolling element contacts the small-diameter rolling element. Accordingly, at the contact portion between the large-diameter rolling element and the small-diameter rolling element, friction due to relative movement between the large-diameter rolling element and the small-diameter rolling element hardly occurs.

In the configuration, when the power transmitted between the first screw groove and the second screw groove constituting the spiral raceway is the prescribed value or less, the aforementioned state where the small-diameter rolling elements are rotatable is maintained. That is, only the large-diameter rolling elements contact the first screw groove and the second screw groove and transmit the power between the first screw groove and the second screw groove. Thus, it is possible to achieve the smooth relative rotation between the ball screw portion and the ball nut without disturbing the rotation of the large-diameter rolling elements with which the small-diameter rolling element makes contact. Accordingly, the steering load of the steering shaft does not increase.

Further, when the power transmitted between the first screw groove and the second screw groove constituting the spiral raceway is larger than the prescribed value, at least one member among the first screw groove, the second screw groove, and the large-diameter rolling elements that contact the first screw groove and the second screw groove is elastically deformed, and thus, a clearance between the first screw groove and the second screw groove is reduced. Thus, in the spiral raceway, the first screw groove and the second screw groove contact the small-diameter rolling elements, and accordingly, the power transmission between the first screw groove and the second screw groove can be performed by both of the large-diameter rolling elements and the small-diameter rolling elements. This improves durability of the rolling elements.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes a steering apparatus according to a concrete embodiment of the disclosure with reference to the drawings. As an example of the steering apparatus, an electric power steering apparatus for a vehicle is described. The electric power steering apparatus is a steering apparatus that assists a steering effort by a steering assist force.

Figure 1:
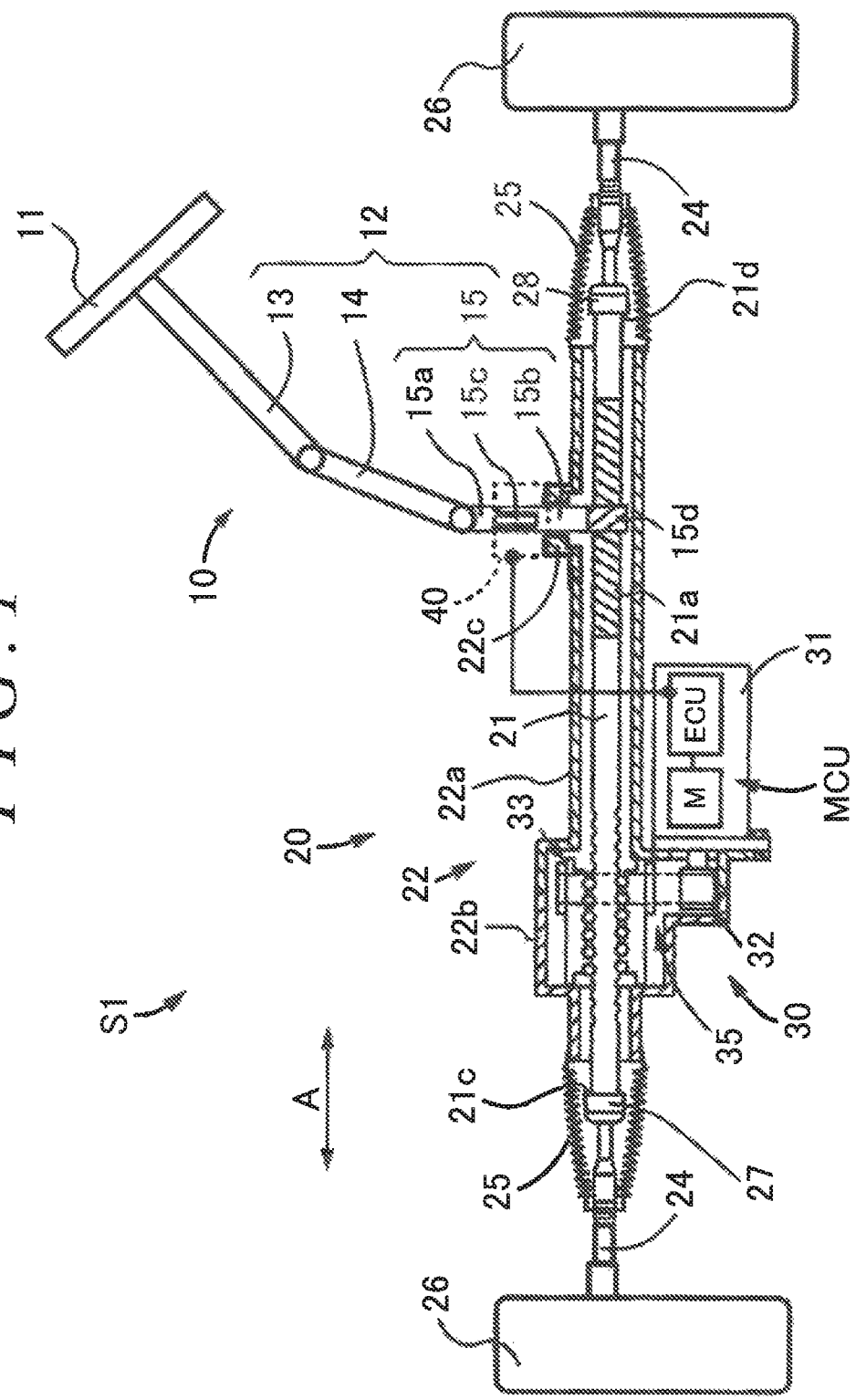
FIG. 1 is a schematic view illustrating an electric power steering apparatus according to an embodiment of the disclosure.

Note that the steering apparatus of the disclosure is applicable to a four-wheel steering apparatus, a rear-wheel steering apparatus, a steer-by-wire apparatus, and the like, other than the electric power steering apparatus. As illustrated in FIG. 1, an electric power steering apparatus S1 includes a steering mechanism 10, a steered mechanism 20, a steering assist mechanism 30, and a torque detection device 40.

As illustrated in FIG. 1, the steering mechanism 10 includes a steering wheel 11 and a steering shaft 12. The steering wheel 11 is fixed to an end of the steering shaft 12. In order to steer steered wheels 26, the steering shaft 12 transmits a steering load Q (steering torque) added to the steering wheel 11. Therefore, in the embodiment, the steering wheel 11 and the steering shaft 12 are rotated integrally and a steering angle of the steering wheel 11 has the same magnitude as that of a rotation angle of the steering shaft 12 around its axis.

The steering shaft 12 is configured by connecting a column shaft 13, an intermediate shaft 14, and a pinion shaft 15. The pinion shaft 15 includes an input shaft 15a, an output shaft 15b, and a torsion bar 15c. An output side part of the intermediate shaft 14 is connected to an input side part of the input shaft 15a, and pinion teeth 15d are formed on an output side part of the output shaft 15b.

The steered mechanism 20 includes a rack shaft 21 (a steered shaft) according to the disclosure and a housing 22 formed in a substantially cylindrical shape. The rack shaft 21 reciprocates in its axis direction in accordance with a steering angle of the steering wheel 11 (the steering shaft 12), and steers the steered wheels 26 of the vehicle. The rack shaft 21 is accommodated and supported in the housing 22 so as to linearly reciprocate along the axis direction.

In the following description, a direction along the axis direction of the rack shaft 21 is also just referred to as an "A-axis direction (see FIG. 1)." The housing 22 includes a first housing 22a, and a second housing 22b fixed to one end (a left side in FIG. 1) of the first housing 22a in the A-axis direction.

The pinion shaft 15 is rotatably supported in the first housing 22a. Rack teeth 21a are formed in the rack shaft 21. The rack teeth 21a and the pinion teeth 15d are engaged with each other so as to constitute a rack-and-pinion mechanism.

The rack shaft 21 includes joints 27, 28 in respective ends of the rack shaft 21. Tie rods 24 are respectively connected to ends of the joints 27, 28. Distal ends of the tie rods 24 are connected to knuckles (not shown) to which the steered wheels 26 are fitted.

Thus, when the steering wheel 11 is steered, its steering load Q (steering torque) is transmitted to the steering shaft 12, so that the pinion shaft 15 is rotated. The rotation of the pinion shaft 15 is converted into a linear reciprocation of the rack shaft 21 by the pinion teeth 15*d* and the rack teeth 21*a*. When the movement along the A-axis direction is transmitted to the knuckles (not shown) via the tie rods 24, the steered wheels 26 are steered, so that a traveling direction of the vehicle is changed. Note that the steering load Q is the magnitude of a resistance force that the steered wheels 26 receive from a road surface according to, mainly, a steering angle θ of the steering wheel 11 and a vehicle speed V of the vehicle at that time. Further, the vehicle speed V of the vehicle is equal to a peripheral velocity of the steered wheels 26 that rotate.

One end of each of boots 25 is fixed to a corresponding one of both ends of the housing 22. The boots 25, which are made of resin, cover joint parts between the joints 27, 28 and the tie rods 24 and include tubular bellows parts stretchable in the A-axis direction. The other end of each of the boots 25 is fixed to a corresponding one of the tie rods 24, so that airtightness of an accommodation space of the steered mechanism 20, including an inner part of the housing 22, is kept by the boots 25.

The steering assist mechanism 30 is a mechanism that applies a steering assist force to the steering mechanism 10, with a motor M being used as a drive source. The motor M is controlled based on an output of the torque detection device 40. The steering assist mechanism 30 includes the first housing 22*a*, the second housing 22*b*, a third housing 31, a motor control unit (MCU), a rotating shaft 32, a ball screw mechanism 33, and a belt transmission mechanism 35.

As illustrated in FIG. 1, in the steering assist mechanism 30, the MCU, in which a controlling portion ECU and the motor M are integrated, is disposed below (below in a gravitational direction) the rack shaft 21. Thus, the electric power steering apparatus S1 of the embodiment is configured as a so-called rack-parallel electric power steering apparatus, and is disposed in an engine compartment in a vehicle front side (i.e., disposed outside a vehicle cabin).

Figure 2:
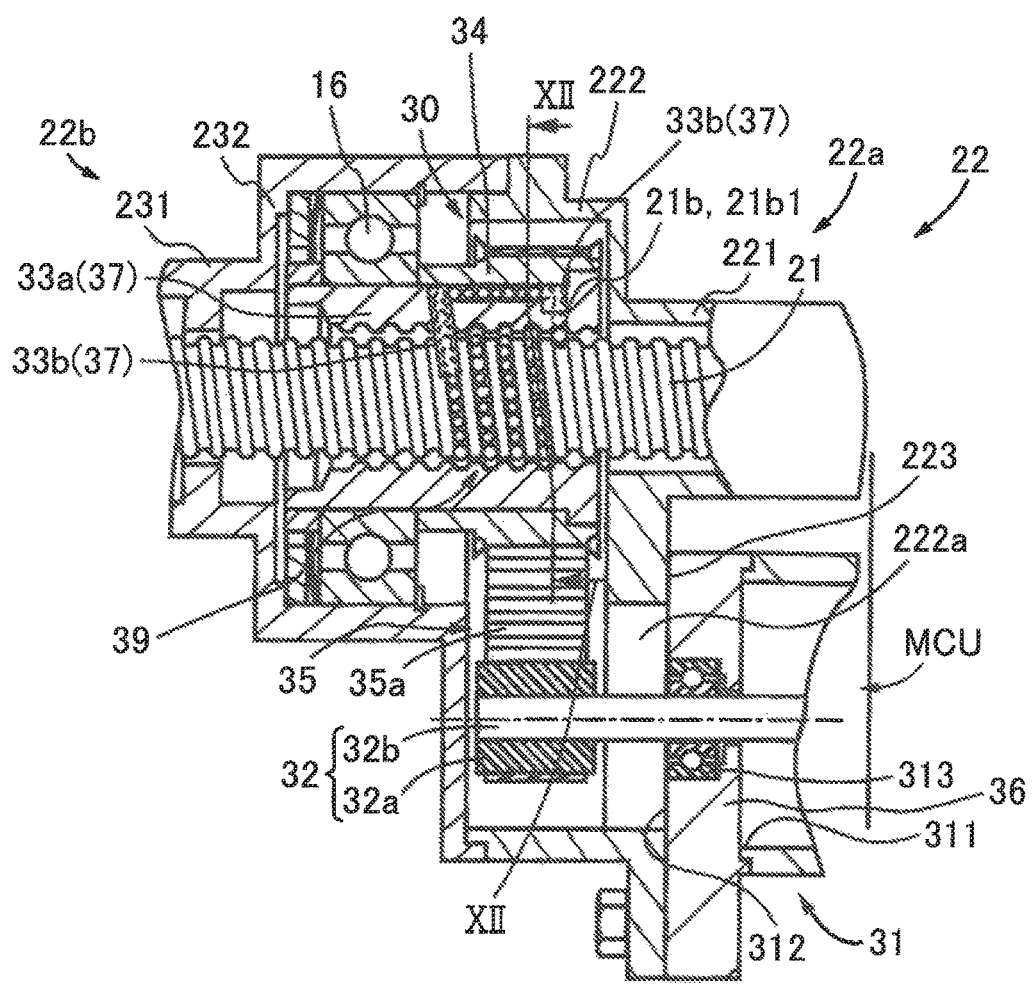
FIG. 2 is a partial enlarged sectional view of a steering assist mechanism of FIG. 1 according to the embodiment.

As illustrated in FIGS. 1, 2, in the steering assist mechanism 30, a rotating torque of the motor M is transmitted to the ball screw mechanism 33 via the belt transmission mechanism 35. The ball screw mechanism 33 converts the rotating torque into a moving force of a linear reciprocating movement of the rack shaft 21 so as to apply a steering assist force to the steering mechanism 10.

As illustrated in FIG. 2, the first housing 22*a* constituting the steering assist mechanism 30 includes a first tubular portion 221 having a cylindrical shape, and a first steering assist housing 222. The first steering assist housing 222 is formed on the second housing 22*b*-side of the first tubular portion 221 (i.e., the first steering assist housing 222 is formed closer to the second housing 22*b* than the first tubular portion 221 is). The first tubular portion 221 is a housing portion which mainly accommodates the rack shaft 21.

The first steering assist housing 222 mainly accommodates devices related to the steering assist mechanism 30, and is formed in a tubular shape having a diameter larger than that of the first tubular portion 221 and projecting downward. An opening 222*a* is formed in an end surface of a part projecting downward in the first steering assist housing 222 such that the opening 222*a* extends through the end surface in the A-axis direction of the rack shaft 21.

The second housing 22*b* includes a second tubular portion 231 having a cylindrical shape, and a second steering assist housing 232. The second steering assist housing 232 is formed on the first housing 22*a*-side of the second tubular portion 231 (i.e., the second steering assist housing 232 is formed closer to the first housing 22*a* than the second tubular portion 231 is). The second tubular portion 231 is a housing portion which mainly accommodates the rack shaft 21. The second steering assist housing 232 mainly accommodates the devices related to the steering assist mechanism 30 together with the first steering assist housing 222, and is formed in a tubular shape having a diameter larger than that of the second tubular portion 231.

The third housing 31 is fixed to a protruding end surface 223 of the first steering assist housing 222 via a plate 36. A surface of the third housing 31, which faces the protruding end surface 223 of the first steering assist housing 222, has an opening 311. The opening 311 is closed by the plate 36. Further, a through-hole through which an output shaft 32*b* of the motor M extends in the A-axis direction is formed in the plate 36.

The motor control unit (MCU) including the motor M is accommodated in the third housing 31. That is, the MCU is attached to the housing 22 such that the MCU is at a distance from the rack shaft 21. The MCU is disposed such that the output shaft 32*b* of the motor M extends in the housing 22. More specifically, as illustrated in FIG. 2, the output shaft 32*b* is provided so as to extend in the second housing 22*b* of the housing 22 such that an axis of the output shaft 32*b* is parallel to the axis of the rack shaft 21 (in other words, the axis of the output shaft 32*b* is offset from the axis of the rack shaft 21). The MCU includes the motor M, the controlling portion ECU configured to drive the motor M, and so on.

The rotating shaft 32 is an output shaft of the motor M and transmits a steering assist force. The rotating shaft 32 includes the output shaft 32*b*, and a drive pulley 32*a* (constituting the belt transmission mechanism 35) disposed on an outer periphery of the output shaft 32*b*. The output shaft 32*b* is rotatably supported by the through-hole of the plate 36 via a bearing 313. The drive pulley 32*a* is disposed on a part of the outer peripheral surface of the output shaft 32*b*, the part being located outside the third housing 31 in the A-axis direction. The drive pulley 32*a* is accommodated in the first steering assist housing 222.

The belt transmission mechanism 35 is constituted by the aforementioned drive pulley 32*a*, a toothed belt 35*a*, and a driven pulley 34. The drive pulley 32*a* and the driven pulley 34 are toothed pulleys each provided with external teeth. The belt transmission mechanism 35 is a mechanism configured such that a driving force (a rotational driving force or a rotating torque) generated by the motor M is transmitted between the drive pulley 32*a* and the driven pulley 34 via the toothed belt 35*a*. The drive pulley 32*a* is provided on the outer periphery of the output shaft 32*b* so as to be rotatable integrally with the output shaft 32*b*.

The toothed driven pulley 34 is fixed to an outer periphery of a ball nut 33*a* so as to be rotatable integrally with the ball nut 33*a*. The toothed belt 35*a* is an annular rubber belt including a plurality of internal teeth on an inner periphery thereof, and is disposed around an outer periphery of the driven pulley 34 and an outer periphery of the drive pulley 32*a* in a state where the toothed belt 35*a* is engaged with the teeth provided on the outer peripheries of the driven pulley 34 and the drive pulley 32*a*, so as to transmit a rotational driving force (a driving force) of the toothed drive pulley 32a to the toothed driven pulley 34. The toothed belt 35a is disposed around the driven pulley 34 and the drive pulley 32a in a state where the toothed belt 35a has a prescribed tensile force so as not to be disengaged from the driven pulley 34 and the drive pulley 32a, that is, so as to prevent tooth skipping. Note that, in the embodiment, the drive pulley 32a is provided substantially directly below the driven pulley 34 in the gravitational direction.

With the above configuration, the steering assist mechanism 30 drives the motor M in accordance with a rotation operation of the steering wheel 11, so as to rotate the output shaft 32b and the drive pulley 32a. A rotation of the drive pulley 32a is transmitted to the driven pulley 34 via the toothed belt 35a. When the driven pulley 34 is rotated, the ball nut 33a provided integrally with the driven pulley 34 is rotated. When the ball nut 33a is rotated, a steering assist force (power) in the axis direction of the rack shaft 21 is transmitted to the rack shaft 21 via a plurality of balls 38 (mainly, large-diameter balls 38a) included in the aftermentioned ball screw mechanism 33.

The torque detection device 40 is fixed to an attachment opening 22c of the housing 22 around the pinion shaft 15. The torque detection device 40 detects a torsion amount of a torsion bar 15c and outputs a signal corresponding to the torsion amount to the controlling portion ECU. The torsion bar 15c is a member that twists in accordance with a difference between a torque of the input shaft 15a and a torque of the output shaft 15b. The controlling portion ECU determines a steering assist torque based on an output signal of the torque detection device 40, so as to control an output of the motor M.

The controlling portion ECU determines a steering center by performing a learning control based on neutral information stored in advance and a travel state. Note that the neutral information is information on a position (an electric angle) of an angle sensor included in the motor M, the position corresponding to a steering center. The position of the angle sensor corresponding to the steering center is measured (i.e., the neutral information is obtained) at the time of vehicle assembly and is stored in a nonvolatile memory in the controlling portion ECU.

The following describes details of the ball screw mechanism 33 according to the disclosure. As described above, the ball screw mechanism 33 is configured to apply a steering assist force to the steering mechanism 10 by converting a rotating torque of the motor M, transmitted via the belt transmission mechanism 35, into a moving force of a linear reciprocating movement of the rack shaft 21.

Figure 3:
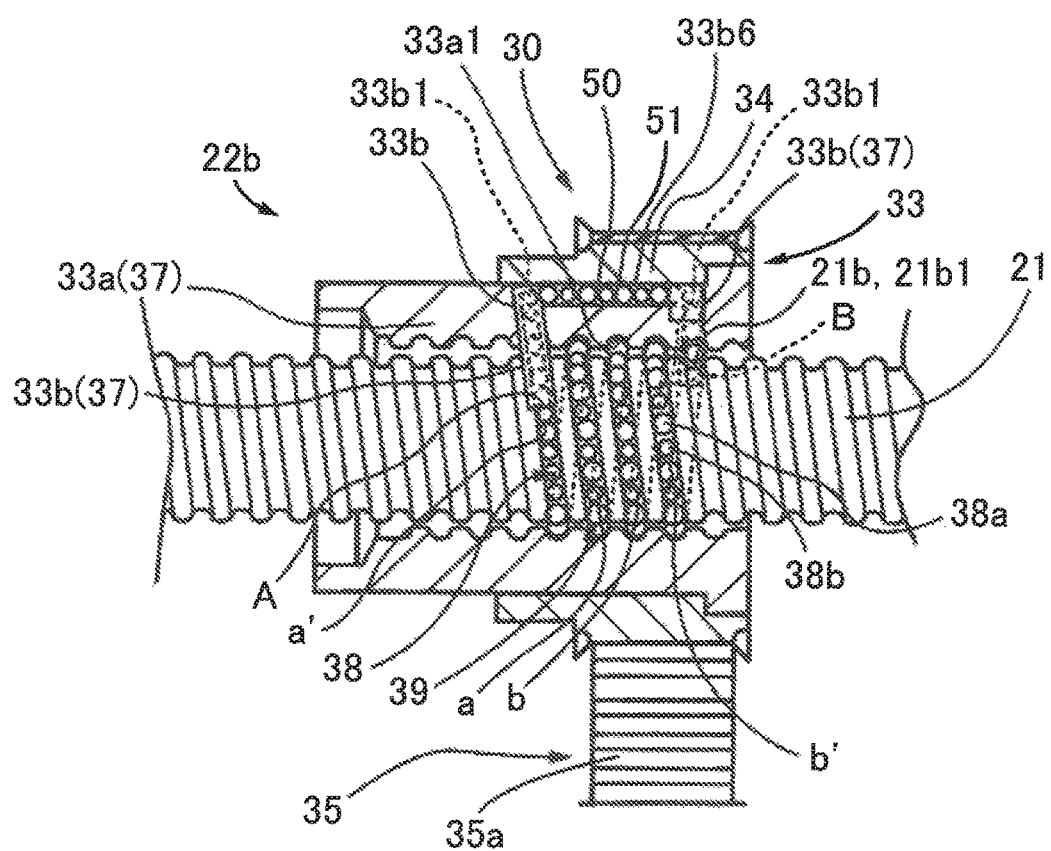
FIG. 3 is a partial enlarged view of FIG. 2.

As illustrated in FIGS. 2, 3, the ball screw mechanism 33 includes a ball screw portion 21b (corresponding to a rolling element screw portion), the aforementioned ball nut 33a (corresponding to a rolling element nut), a connecting member 37, and the plurality of balls 38 (corresponding to rolling elements). The plurality of balls 38 is a ball group constituted by a plurality of large-diameter balls 38a (corresponding to large-diameter rolling elements), and a plurality of small-diameter balls 38b (corresponding to small-diameter rolling element) having a diameter smaller than a diameter of the large-diameter balls 38a by a prescribed diameter difference α.

The ball screw portion 21b is formed on an outer peripheral surface of the rack shaft 21 illustrated in FIG. 1 over a prescribed range along the A-axis direction (the left side in FIG. 1). A first screw groove 21b1 is formed in the ball screw portion 21b. The first screw groove 21b1 is a spiral groove formed on the outer peripheral surface of the rack shaft 21 with a prescribed lead (pitch).

The ball nut 33a (the rolling element nut) is a cylindrical member disposed around an outer periphery of the ball screw portion 21b. The ball nut 33a includes a second screw groove 33a1 on an inner peripheral surface thereof. The second screw groove 33a1 is a groove corresponding to the first screw groove 21b1 of the ball screw portion 21b. The second screw groove 33a1 is a spiral groove formed so as to face the first screw groove 21b1 of the ball screw portion 21b, and having the same lead as the lead (pitch) of the first screw groove 21b1. As illustrated in FIG. 2, one end of the cylindrical shape of the ball nut 33a is supported by the second steering assist housing 232 of the second tubular portion 231 (the second housing 22b) (corresponding to a housing according to the disclosure) via a ball bearing 16. That is, the ball nut 33a is supported by the second steering assist housing 232 in a cantilever state. Further, the aforementioned toothed driven pulley 34 is fixed to the other end of the ball nut 33a. The toothed belt 35a is disposed around the driven pulley 34 and the outer periphery of the drive pulley 32a in a state where the toothed belt 35a has a prescribed tensile force as described above.

Figure 4:
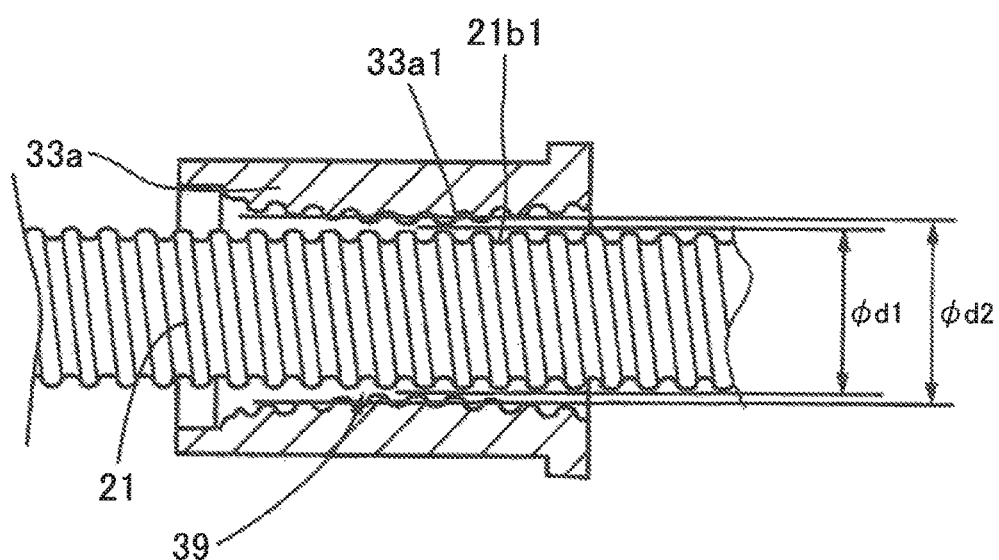
FIG. 4 is a schematic view for illustrating an inner peripheral surface shape of the rolling element nut.

Further, as illustrated in a schematic view of FIG. 4, the second screw groove 33a1 is configured such that a pitch circle inside diameter $\phi d1$ is smallest at a central part of the ball nut 33a in the axis direction, the pitch circle inside diameter gradually increases toward both sides, and a pitch circle inside diameter $\phi d2$ is largest at both ends (both axial ends) of the ball nut 33a ($\phi d1 < \phi d2$) in the axis direction. This prevents the rack shaft 21 and the ball nut 33a from interfering with each other when an external input from a road surface is applied and the rack shaft 21 is bent. Note that, at this time, the pitch circle inside diameter of the second screw groove 33a1 corresponds to a pitch circle diameter of a ball screw defined in JISB1192.

A spiral raceway 39 is constituted by the first screw groove 21b1 and second screw groove 33a1. More specifically, the spiral raceway 39 in which the plurality of balls 38 (rolling elements) is accommodated is constituted by a groove surface of the first screw groove 21b1, a groove surface of the second screw groove 33a1, and a space between the groove surfaces (see a schematic view of FIG. 6). As described above, the second screw groove 33a1 is formed such that the pitch circle inside diameter is small at the central part of the ball nut 33a in the axis direction and the pitch circle inside diameter is large at both axial ends. Therefore, the spiral raceway 39 is configured such that its passage diameter in a radial direction is small at a central position of the ball nut 33a in the axis direction and the passage diameter in the radial direction is large at both axial ends thereof.

Thus, even if the rack shaft 21 having the first screw groove 21b1 threadedly engaged with the second screw groove 33a1 via the balls 38 is bent due to a load input into at least one end thereof, the balls 38 disposed at and near both axial ends of the ball nut 33a are held between the first screw groove 21b1 and the second screw groove 33a1, and are prevented from being pressed by the first screw groove 21b1 with an excessive load.

Figure 5:
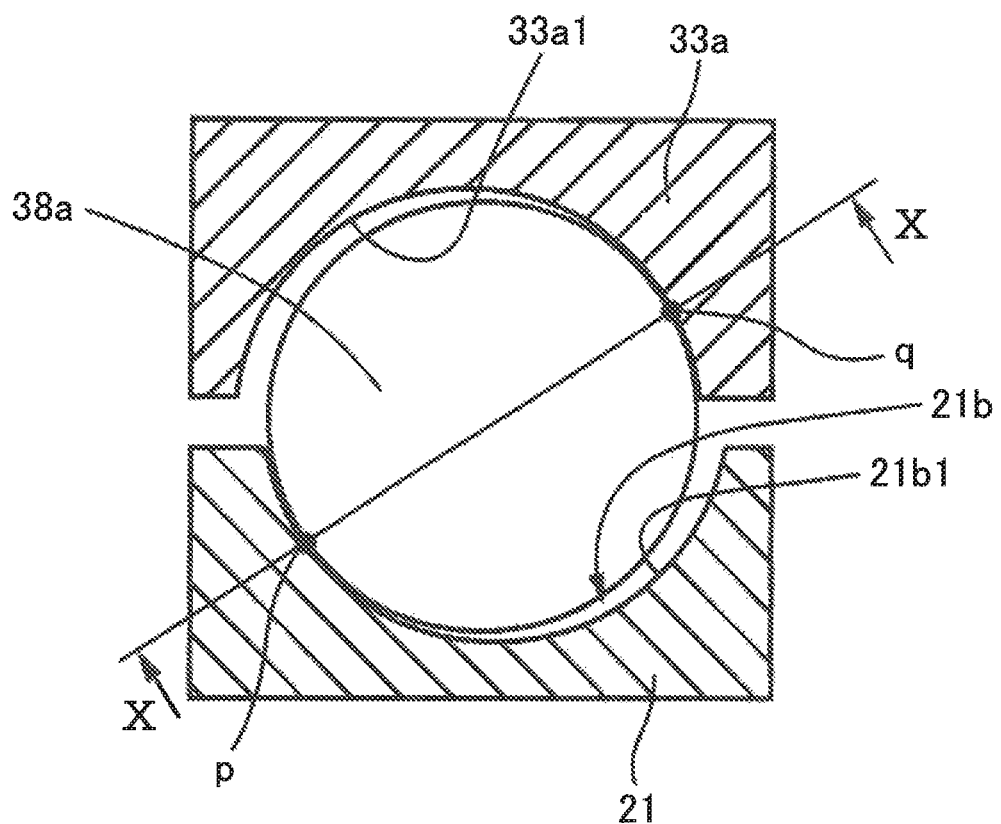
FIG. 5 is a view for illustrating a relationship between a spiral raceway and a large-diameter ball.

The first screw groove 21b1 of the spiral raceway 39 and the second screw groove 33a1 facing the first screw groove 21b1 are formed as illustrated in FIG. 5. The embodiment is described on the premise that each of the first screw groove 21b1 and the second screw groove 33a1 is a known single round groove. Note that each of the first screw groove 21b1 and the second screw groove 33a1 is not limited to the single round groove, and may be a known single Gothic arch groove, or the like.

At the time of ball screw rotation, that is, when the ball nut 33a (the rolling element nut) and the rack shaft 21 are rotated relative to each other, each large-diameter ball 38a with a large diameter among the balls 38 makes contact with a point q on the groove surface of the second screw groove 33a1 (the ball nut 33a) and a point p on the groove surface of the first screw groove 21b1 (the ball screw portion 21b) as illustrated in FIG. 5. At the time of the ball screw rotation, power P (not shown) is transmitted between the second screw groove 33a1 (the ball nut 33a) and the first screw groove 21b1 (the rack shaft 21) via the large-diameter ball 38a.

Figure 6:
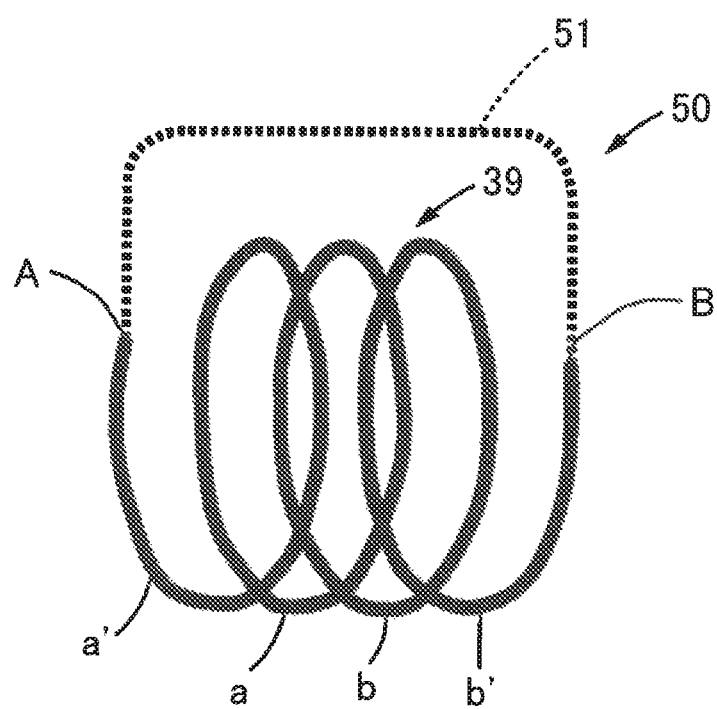
FIG. 6 is a schematic view of a circulation passage.

Further, as illustrated in the schematic view of FIG. 6, the spiral raceway 39 is an assembly of single-threaded-spiral passages in which two single-threaded-spiral passages a, b are wound around the axis, for example. Each of the single-threaded-spiral passages a, b is a spiral passage wound in a spiral manner by one turn or less (i.e., by 360 degrees or less) around the axis of the rack shaft 21. That is, the spiral raceway 39 is a spiral raceway formed such that a plurality of single-threaded-spiral passages is wound around the axis, and the assembly of the single-threaded-spiral passages is referred to as a multi-row spiral raceway in the embodiment.

Note that the spiral raceway 39 includes the single-threaded-spiral passages a, b each of which is wound by one turn, and single-threaded-spiral passages a', b' provided outside the single-threaded-spiral passages a, b in the axis direction. The single-threaded-spiral passages a', b' include an end A and an end B in respective ends. Each of the single-threaded-spiral passages a', b' is wound by less than one turn (less than 360 degrees). Further, the number of single-threaded-spiral passages is not limited to two like the single-threaded-spiral passages a, b, and may be any number.

In the embodiment, the connecting member 37 includes the aforementioned ball nut 33a and a deflector 33b. The connecting member 37 includes a connecting passage 51 connected to both ends (e.g., the end A and the end B in FIG. 6) of the spiral raceway 39 and forming a continuous circulation passage 50 (see FIG. 3, FIG. 6) together with the spiral raceway 39. The connecting passage 51 is a passage for the plurality of balls 38, and the connecting passage 51 is formed in the ball nut 33a and the deflectors 33b.

Figure 7:
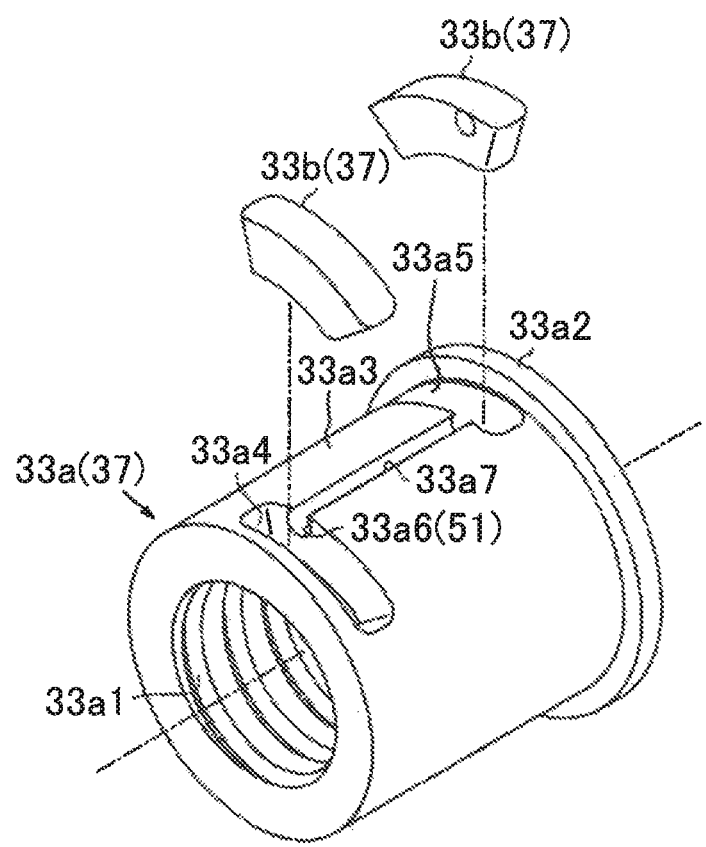
FIG. 7 is a view for illustrating a rolling element nut and deflectors.

As illustrated in FIG. 7, a flange portion 33a2 is formed on the other end of the ball nut 33a in the axis direction. Further, a pair of elongated attachment holes 33a4, 33a5 is formed in the ball nut 33a, so as to extend from an outer peripheral surface 33a3 of the ball nut 33a to the second screw groove 33a1 on an inner peripheral surface of the ball nut 33a.

The attachment holes 33a4, 33a5 are disposed so as to be distanced from each other in the axial direction of the ball nut 33a. For example, the attachment holes 33a4, 33a5 are disposed such that two single-threaded-spiral passages a, b of the spiral raceway 39 are located between the attachment holes 33a4, 33a5. The deflectors 33b are press-fitted to the pair of attachment holes 33a4, 33a5, respectively. Further, a communication groove 33a6 connecting the attachment hole 33a4, 33a5 is formed on the outer peripheral surface 33a3 of the ball nut 33a.

Figure 8:
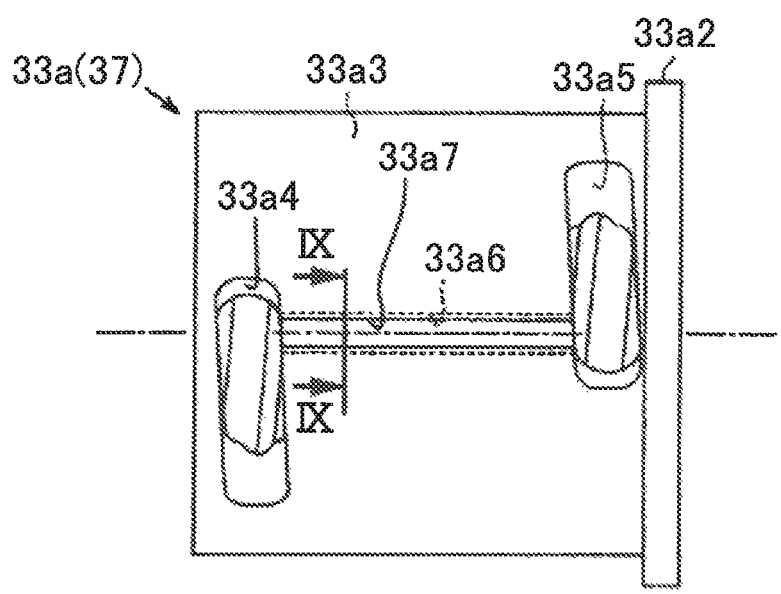
FIG. 8 is a top view of the rolling element nut.
Figure 9:
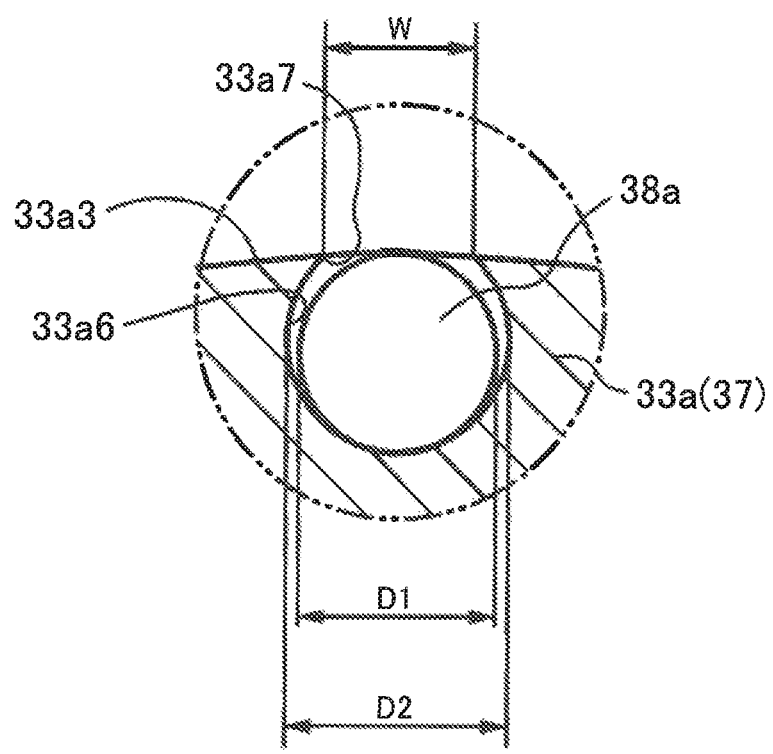
FIG. 9 is a sectional view taken along an arrow IX-IX in FIG. 8.

As illustrated in FIGS. 8 and 9, the communication groove 33a6 is constituted by a groove having a C-shaped section with an opening 33a7 opened on the outer peripheral surface 33a3 of the ball nut 33a. As illustrated in FIG. 9, a diameter D2 of the communication groove 33a6 is slightly larger than a diameter D1 of the large-diameter ball 38a (the large-diameter rolling element) among the balls 38. Further, a width W of the opening 33a7 of the communication groove 33a6 is smaller than the diameter D1 of the large-diameter ball 38a.

Further, as illustrated in FIG. 3, the deflectors 33b have respective through-holes 33b1 formed so as to connect the communication groove 33a6 to the end A and the end B, which are both ends of the spiral raceway 39. The deflector 33b has a function to guide the balls 38 (the large-diameter balls 38a or the small-diameter balls 38b) taken up from one end (the end A or the end B) of the spiral raceway 39 to the communication groove 33a6 via the through-hole 33b1. Further, the deflector 33b has a function to discharge the balls 38 in the communication groove 33a6 to the other end (the end B or the end A) of the spiral raceway 39 via the through-hole 33b1.

Thus, the through-holes 33b1 of the deflectors 33b and the communication groove 33a6 of the ball nut 33a constitute the connecting passage 51 that takes a shortcut between the end A and the end B of the spiral raceway 39 (see FIG. 3, FIG. 6). Thus, the balls 38 disposed in the circulation passage 50 can endlessly circulate through the continuous circulation passage 50 including the spiral raceway 39, via the connecting passage 51.

Thus, the circulation passage 50 formed by the multi-row spiral raceway 39 and one connecting passage 51 is referred to as a multi-row single-circulation passage in the embodiment. Note that all the balls 38 can move freely in the connecting passage 51. However, the balls 38 cannot move by rolling by themselves in the connecting passage 51, and can move in the connecting passage 51 by being pushed by an urging force of the ball 38 (the large-diameter ball 38a or the small-diameter ball 38b) taken up from one end of the spiral raceway 39.

As described above, the plurality of balls 38 is a ball group constituted by the plurality of large-diameter balls 38a and the plurality of small-diameter balls 38b. As illustrated in a schematic view of FIG. 10, in the embodiment, the large-diameter balls 38a and the small-diameter balls 38b are aligned alternately one by one in the circulation passage 50. A prescribed diameter difference α between a diameter of the large-diameter balls 38a and a diameter of the small-diameter balls 38b is set in advance. The prescribed diameter difference α between respective diameters of the large-diameter balls 38a and the small-diameter balls 38b is generally a few micrometers to a dozen or so micrometers. A method of setting the prescribed diameter difference α will be described later. The large-diameter balls 38a and the small-diameter balls 38b are made of an iron-based material such as stainless bearing steel, for example.

Here, the following describes a reason why the prescribed diameter difference α is set between the diameter of the large-diameter balls 38a and the diameter of the small-diameter balls 38b. For this description, the following deals with related art illustrated in FIG. 11 in which no diameter difference is set between diameters of balls disposed in a ball screw mechanism. A case is assumed in which known ball clogging as illustrated in FIG. 11 is caused in a plurality of balls B when the balls B disposed in the ball screw mechanism are constituted only by balls B having the same diameter, as in the related art.

Figure 11:
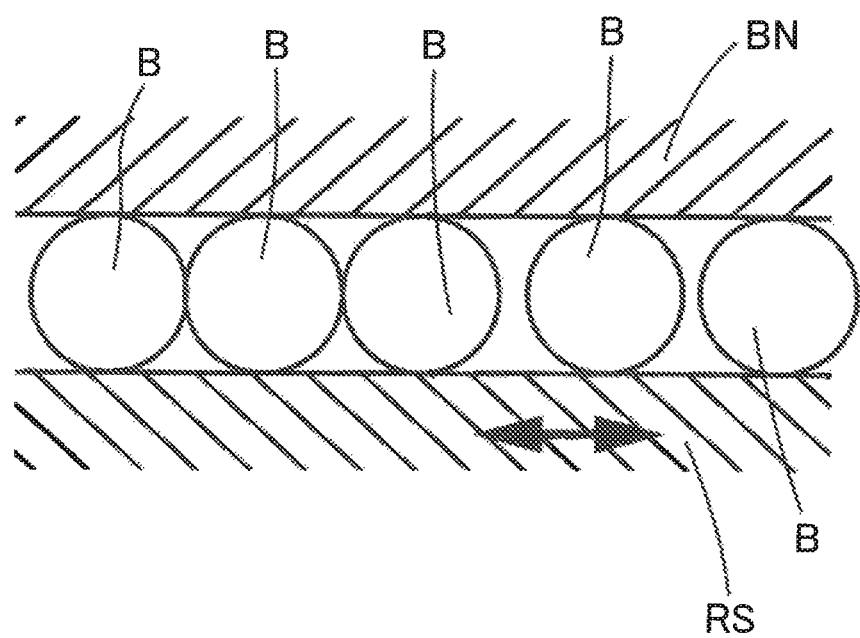
FIG. 11 is a view for illustrating ball clogging based on a configuration of related art.

Note that the ball clogging is a known phenomenon in which the plurality of balls B in a spiral raceway comes close to each other so as to eventually contact each other (see three balls on the left side in FIG. 11). There are various reasons that cause the ball clogging. For example, there is a case where ball clogging is caused for the reason that a magnitude of the passage diameter of the spiral raceway is uneven. Note that in the embodiment, it is assumed that the ball clogging is caused due to the unevenness in the passage diameter.

That is, in the embodiment, as described above, one end (the left side in FIG. 2) of the ball nut 33a is supported in a cantilever state by the second steering assist housing 232. Further, the toothed driven pulley 34 is fixed to the other end of the ball nut 33a. The toothed belt 35a is disposed around the driven pulley 34 and the drive pulley 32a provided on the output shaft of the motor M, in a state where the toothed belt 35a has a prescribed tensile force. Therefore, the toothed belt 35a pulls, downward in the gravitational direction, the other end of the ball nut 33a, one end of the ball nut 33a being supported in a cantilever state.

Figure 12:
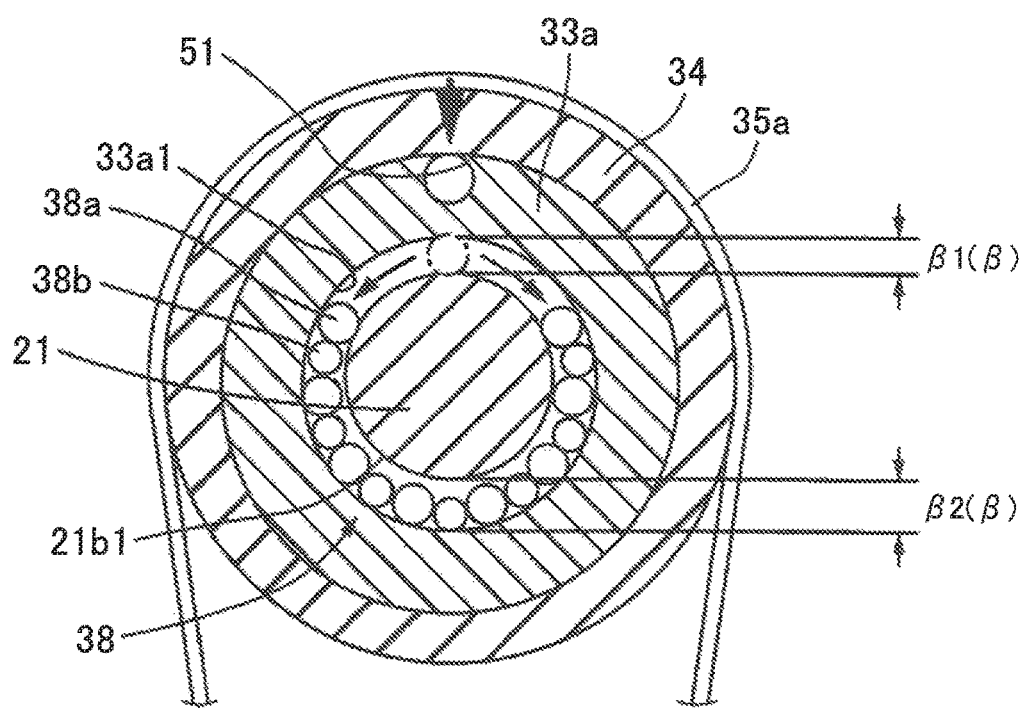
FIG. 12 is a sectional view along an arrow XII-XII in FIG. 2, and is a view for illustrating ball clogging in the embodiment.

As a result, the other end of the ball nut 33a is displaced downward with the one end serving as a rotation center. At this time, in the spiral raceway 39 in the ball screw mechanism 33, a clearance β (distance) between the first screw groove 21b1 and the second screw groove 33a1 may become uneven as illustrated in FIG. 12. For example, in the embodiment, the toothed belt 35a pulls the other end of the ball nut 33a downward. Therefore, a clearance on the upper side in the spiral raceway 39 is narrowed to β1. Further, a clearance on the lower side in the spiral raceway 39 is widened to β2.

Thus, as illustrated in FIG. 12, the balls 38 in the spiral raceway 39 is pushed out from the upper side toward the lower side. This may cause a ball clogging state where the large-diameter ball 38a and the small-diameter ball 38b, which are adjacent to each other among the balls 38, contact each other on the lower side in the spiral raceway 39. Note that the unevenness in the clearance β between the first screw groove 21b1 and the second screw groove 33a1 constituting the spiral raceway 39 varies in a circumferential direction depending on a direction of the tensile force of the toothed belt 35a.

Further, in other words, in the embodiment, the second screw groove 33a1 of the ball nut 33a is formed such that the pitch circle inside diameter φd1 is small at the central part of the ball nut 33a in the axis direction, and the pitch circle inside diameter φd2 is large at both axial ends thereof, as described above. Therefore, a radial passage diameter of the spiral raceway 39 constituted by the first screw groove 21b1 and the second screw groove 33a1 is small at the central part of the ball nut 33a in the axis direction and is large at both axial ends thereof (see FIG. 4).

This may cause a case where the balls 38 in the spiral raceway 39 are pushed toward the both ends from the central part of the ball nut 33a in the axis direction. Further, since the radial passage diameter of the spiral raceway 39 at the both ends of the ball nut 33a is large, the balls 38 easily fall downward from the upper side due to the gravity at the both ends of the ball nut 33a, as illustrated in FIG. 12. This may accordingly cause a ball clogging state where the large-diameter ball 38a and the small-diameter ball 38b, which are adjacent to each other among the balls 38, contact each other at the both ends of the spiral raceway 39 and on the lower side thereof.

Note that the ball clogging may include a case where the balls B in the spiral raceway come close to each other and eventually contact each other even when the steering wheel 11 is steered slightly right and left within a range of approximately ±5 to 20 degrees, for example (see three balls on the left side in FIG. 11). In any case, the ball clogging is a known phenomenon, so details thereof are omitted.

Figure 13:
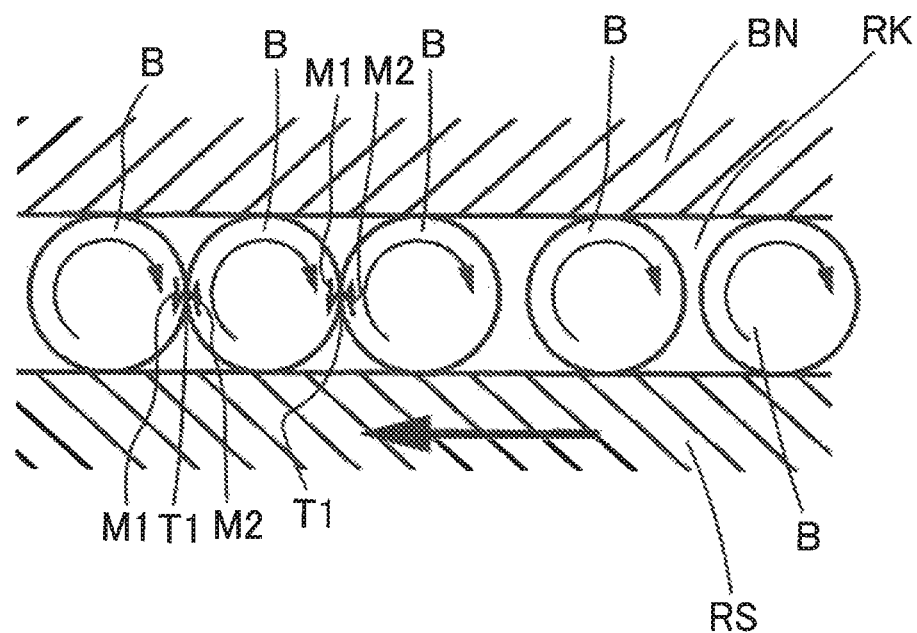
FIG. 13 is a view for illustrating an action of the rolling elements when ball clogging is caused in the configuration of the related art.

In a state where the ball clogging due to the gravity is caused in the plurality of balls B of the ball screw mechanism, a driver steers a steering wheel, so that a rack shaft RS (the rolling element screw portion) moves toward a left side in FIG. 13 (see an arrow in RS in FIG. 13), for example, as illustrated in FIG. 13. Thus, the plurality of balls B contacting each other in a spiral raceway RK is rotated in the same direction (see arrows in the balls B in FIG. 13) in accordance with relative rotation direction of the rack shaft RS (the rolling element screw portion) and a ball nut BN (the rolling element nut).

Therefore, as illustrated in FIG. 13, movements (rotations) M1, M2 in opposite directions occur at a contact portion T1 between the balls B, so that each ball B disturbs, due to friction, a rotation of its counterpart ball B with which the ball B makes contact and abrasion is caused. Thus, a steering force of the steering wheel, which is required to move the rack shaft RS in the axial direction, increases. This may make the driver feel that a steering load Q of the steering wheel increases and becomes heavy. Hereinafter, a phenomenon in which steering load Q increases and becomes heavy due to the ball clogging is referred to as a steering load fluctuation.

Figure 10:
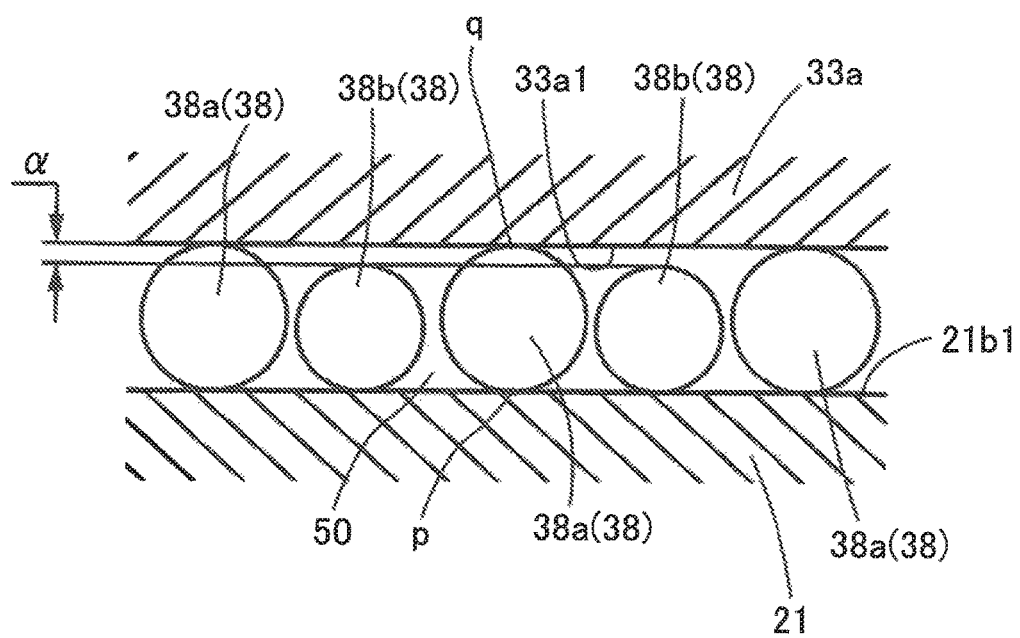
FIG. 10 is a partial sectional view taken along an arrow X-X in FIG. 5, and is a view for illustrating rolling elements disposed in the spiral raceway.

In this regard, in the disclosure, the large-diameter balls 38a and the small-diameter balls 38b having a diameter smaller than the diameter of the large-diameter balls 38a by the prescribed diameter difference α are disposed alternately in the circulation passage 50, as illustrated in FIG. 10. Thus, in a case where ball clogging as described above is caused in the spiral raceway 39 of the ball screw mechanism 33 during driving of the vehicle, when a steering angle is within a range defined by a prescribed steering angle θ1, in other words, when the power P transmitted between the first screw groove 21b1 and the second screw groove 33a1 is a prescribed value P1 or less, the steering load fluctuation can hardly occur. In other words, in the embodiment, even if the other end of the ball nut 33a is displaced downward due to a tensile force of the toothed belt 35a and ball clogging is caused in the spiral raceway 39 of the ball screw mechanism 33, the steering load fluctuation can hardly occur. More specifically, as illustrated in FIG. 10, the large-diameter balls 38a and the small-diameter balls 38b having a diameter smaller than the diameter of the large-diameter balls 38a by the prescribed diameter difference α are disposed alternately in the circulation passage 50, and thus, the steering load fluctuation can hardly occur.

Figure 14:
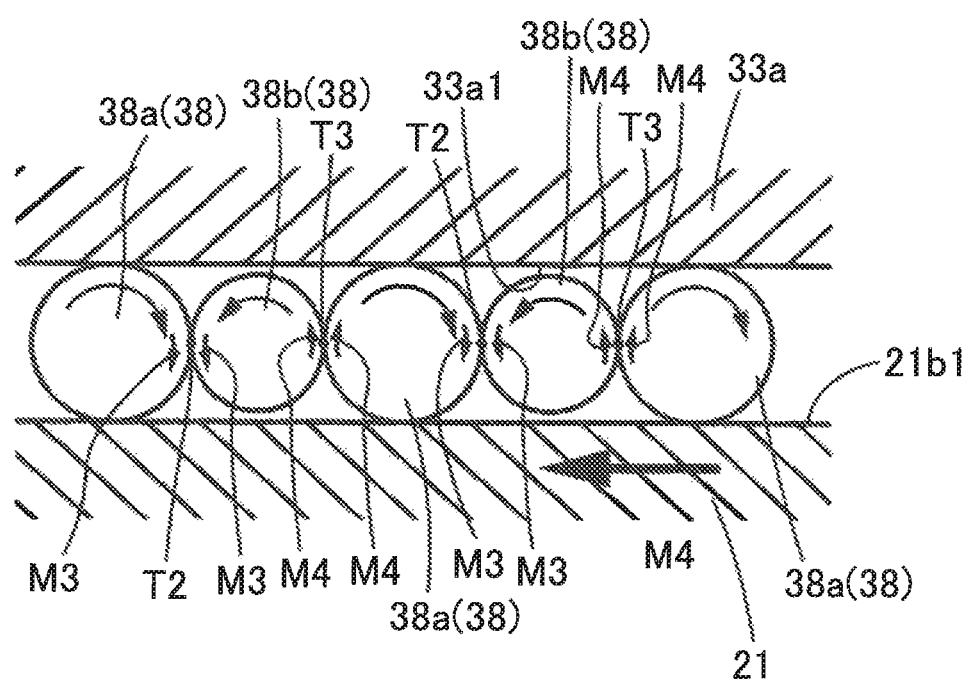
FIG. 14 is a view for illustrating an action of the rolling elements when ball clogging is caused in the embodiment.

When ball clogging is caused in the balls 38 of the ball screw mechanism 33 in a state where the balls 38 are disposed as described above, the large-diameter balls 38a roll in the same direction between the first screw groove 21b1 (the rack shaft 21) and the second screw groove 33a1 (the ball nut 33a) in accordance with relative movement direction of the rack shaft 21 and the ball nut 33a as illustrated in FIG. 14, similarly to the related art.

However, at this time, the diameter of the small-diameter balls 38b each disposed between the large-diameter balls 38a has a prescribed negative diameter difference α with respect to the diameter of the large-diameter balls 38a. Therefore, in the ball clogging state, each of the small-diameter balls 38b contacts its adjacent large-diameter balls 38a, but does not contact the rack shaft 21 (the first screw groove 21b1) and the ball nut 33a (the second screw groove 33a1), and thus, the small-diameter balls 38b are not held between the rack shaft 21 and the ball nut 33a. Thus, the small-diameter balls 38b are not restricted by the first screw groove 21b1 and the second screw groove 33a1.

Accordingly, at the time when the ball screw rotates, each of the small-diameter balls 38b contacts its adjacent large-diameter balls 38a on both sides thereof and rotates in a direction opposite to the rotation direction of the large-diameter balls 38a. That is, as illustrated in FIG. 14, at contact portions T2, T3 each of which is between the small-diameter ball 38b and the large-diameter ball 38a, the large-diameter balls 38a and the small-diameter balls 38b move together in the same direction, i.e., a M3 direction or a M4 direction. Accordingly, friction is not caused, and thus, the small-diameter balls 38b and the large-diameter balls 38a do not disturb each other. Accordingly, abrasion is not caused at the contact portions T2, T3. Thus, the steering load Q of the steering wheel 11 does not increase to be heavy, and thus, the driver can smoothly steer the steering wheel 11.

However, at this time, the small-diameter balls 38b do not make contact with the first screw groove 21b1 and the second screw groove 33a1 as described above. Therefore, only the large-diameter balls 38a transmit the power P between the first screw groove 21b1 (the rack shaft 21) and the second screw groove 33a1 (the ball nut 33a).

That is, in the embodiment, the number of large-diameter balls 38a that transmit the power P between the first screw groove 21b1 (the rack shaft 21) and the second screw groove 33a1 (the ball nut 33a) is approximately half, as compared to the related art in which all the balls B have the same diameter. Thus, when the power P transmitted between the rack shaft 21 and the ball nut 33a increases, durability for strength of the large-diameter balls 38a may decrease in comparison with the related art.

In view of this, in the embodiment, when the transmitted power P increases to be larger than a prescribed value P1, the strength of the large-diameter balls 38a is secured. For this purpose, first, a range in which a steering load fluctuation is not caused, and which is defined by a prescribed steering angle θ1 of a steering angle θ of the steering wheel 11 is set. That is, the prescribed value P1 of the transmitted power P is replaced with the steering angle θ of the steering wheel 11. From search of documents, experiments, and the like, the inventors of the disclosure considered that, in a case where a vehicle travels straight at a high speed, when the range in which a steering load fluctuation due to ball clogging is not caused and which is defined by the prescribed steering angle θ1 is set to be equal to or larger than −40 degrees and equal to or smaller than +40 degrees, that is, when the prescribed steering angle θ1 is set to ±40 degrees, discomfort felt by a driver can be reduced. In view of this, the range in which a steering load fluctuation is not caused and which is defined by the prescribed steering angle θ1 of the steering wheel 11 is set to be equal to or larger than −40 degrees, and equal to or smaller than +40 degrees (see FIG. 16). However, the range of ±40 degrees is an example, and the prescribed steering angle θ1 may be any degrees.

Accordingly, in a case where the steering angle θ is within the range defined by the prescribed steering angle θ1 (±40 degrees), the power P is transmitted between the first screw groove 21b1 (the rack shaft 21) and the second screw groove 33a1 (the ball nut 33a) by only the large-diameter balls 38a.

Next will be described a method for improving the durability for the strength of the large-diameter balls 38a in a case where the steering angle θ exceeds the prescribed steering angle θ1 (in a case where the steering angle θ is out of the range defined by the prescribed steering angle θ1). The method is as follows. That is, in a case where the steering angle θ exceeds the prescribed steering angle θ1 (±40 degrees), that is, in a case where the power P transmitted between the first screw groove 21b1 (the rack shaft 21) and the second screw groove 33a1 (the ball nut 33a) exceeds the prescribed value P1, the first screw groove 21b1 and the second screw groove 33a1 contact the small-diameter balls 38b in addition to the large-diameter balls 38a.

Figure 15:
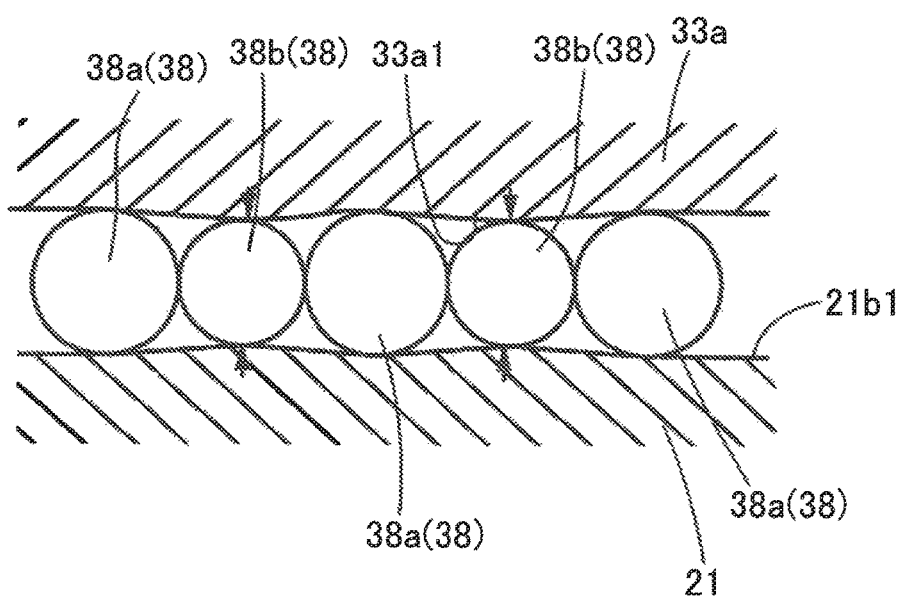
FIG. 15 is a view for illustrating the spiral raceway when power is transmitted by large-diameter rolling elements and small-diameter rolling elements in the embodiment.

Therefore, in the case where the steering angle θ exceeds the prescribed steering angle θ1 (±40 degrees), due to the prescribed value P1 of the power P, at least one member among the large-diameter balls 38a, the first screw groove 21b1, the second screw groove 33a1 is further elastically deformed by the prescribed diameter difference α, and thus, the groove surface of the first screw groove 21b1 and the groove surface of the second screw groove 33a1 are brought into contact with the small-diameter balls 38b (see FIG. 15).

Note that, even before the steering angle θ exceeds the prescribed steering angle θ1 (±40 degrees), the elastic deformation of the at least one member among the large-diameter balls 38a, the first screw groove 21b1, the second screw groove 33a1 is started. A difference of this case from the case where the steering angle θ exceeds the prescribed steering angle θ1 (±40 degrees) is whether or not the groove surface of the first screw groove 21b1 and the groove surface of the second screw groove 33a1 contact the small-diameter balls 38b. The prescribed value P1 is a value determined based on a graph G1, which will be describe later more specifically.

At the time when the groove surface of the first screw groove 21b1 and the groove surface of the second screw groove 33a1 contact the small-diameter balls 38b, a displacement amount t (not shown) from the time when each of the groove surfaces starts to be displaced toward the small-diameter balls 38b from an initial position until each of the groove surfaces contacts the small-diameter balls 38b is a total of displacement amounts of the first screw groove 21b1, the second screw groove 33a1, and the large-diameter balls 38a. The initial position of each of the groove surfaces is a position in a state where the steering angle θ of the steering wheel 11 is neutral. When the total exceeds the prescribed diameter difference α between the diameter of the large-diameter balls 38a and the diameter of the small-diameter balls 38b, the small-diameter balls 38b also contact the first screw groove 21b1 and the second screw groove 33a1.

Thus, a load, which is applied to the large-diameter balls 38a due to the transmission of the power P between the first screw groove 21b1 (the rack shaft 21) and the second screw groove 33a1 (the ball nut 33a), can be shared with the small-diameter balls 38b.

The prescribed diameter difference α, which is a prescribed amount, is set, for example, empirically such that the small-diameter balls 38b contact the first screw groove 21b1 and the second screw groove 33a1 due to the prescribed value P1 of the power P transmitted between the first screw groove 21b1 and the second screw groove 33a1 when the steering angle θ exceeds the prescribed steering angle θ1 (±40 degrees). The large-diameter balls 38a, the first screw groove 21b1, and the second screw groove 33a1 are made of an iron-based material having an appropriate Young's modulus that can achieve the above action.

Figure 16:
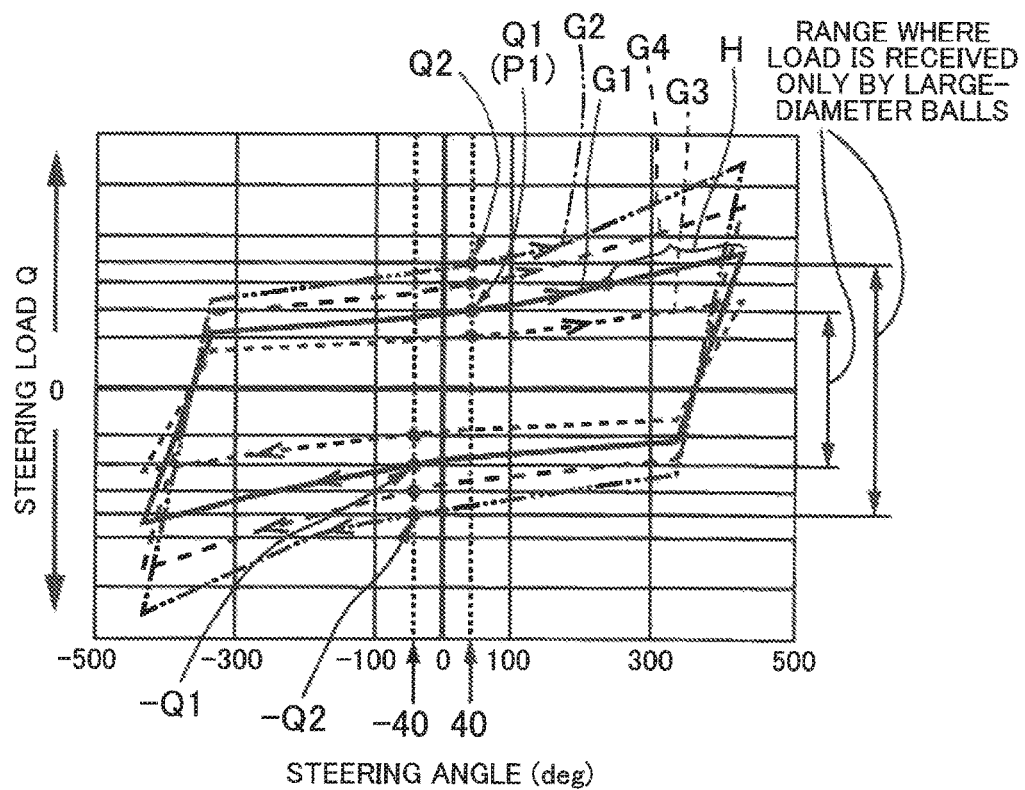
FIG. 16 is a graph illustrating a relationship between a steering load and a steering angle of a steering wheel.

As described above, the prescribed value P1 of the power P transmitted between the first screw groove 21b1 and the second screw groove 33a1 is determined based on the graph G1 illustrated in FIG. 16. Note that the graph G1 of FIG. 16 is a graph based on experiment and indicates a relationship between the steering angle θ and the steering load Q of the steering wheel 11 (the steering shaft 12) at the time when the steering wheel 11 is steered in a normal time (a road surface is a dry paved road surface, and the steered wheels 26 have tire grooves with a sufficient depth). As will be described later, graphs G1, G2 in FIG. 16 are graphs based on different conditions regarding a vehicle speed V. The embodiment is described only using the graphs G1, G2.

Note that the normal time as used herein indicates, for example, a time when no ball clogging is caused in the plurality of balls 38 circulating through the circulation passage 50 and the balls 38 can roll smoothly in the spiral raceway 39 in the ball screw mechanism 33 of the disclosure.

The graph G1 indicated by a solid line is a graph indicative of a relationship between the steering angle θ (degree) and the steering load Q of the steering wheel 11 (the steering shaft 12) in a state where the steered wheels 26 rotate at a prescribed peripheral velocity, e.g., at X km/h, that is, in a state where the vehicle travels at a prescribed vehicle speed of X km/h. In the embodiment, X km/h is 80 km/h, which is one example of a travel speed on, for example, an express highway.

Note that the graph G2 indicated by an alternate long and two short dashes line is a graph indicative of a relationship between the steering angle θ (degree) and the steering load Q of the steering wheel 11 (the steering shaft 12) in a case where the steering wheel 11 is steered in a vehicle-stop state where the prescribed peripheral velocity of the steered wheels 26 is 0 km/h, for example.

Further, in FIG. 16, the relationship between the steering angle θ (degree) and the steering load Q of the steering wheel 11 varies depending on the vehicle speed V of the vehicle. That is, a plurality of relationships between the steering angle θ (degree) and the steering load Q of the steering wheel 11 from a vehicle speed of 0 km/h to a vehicle speed of 80 km/h, for example, exists between G1 and G2 so as to correspond to respective vehicle speeds V. Further, there is also a plurality of relationships corresponding to respective vehicle speeds V on an opposite side of G1 from G2. As the vehicle speed V becomes higher than the vehicle speed of the graph G1, the graph moves toward a side where the steering load is smaller, like the graph G3. Further, as the vehicle speed V becomes lower than the vehicle speed of the graph G1, the graph moves toward a side where the steering load Q is larger, like a graph G2.

Further, in the graphs G1 and G2, a steering load Q at the time when the steering wheel 11 is steered toward a right side from a position at a steering angle of 0 degrees is indicated by a line on the right side relative to the steering angle 0 degrees and on the upper side relative to the graph G1. Further, a steering load Q at the time when the steering wheel 11 is steered toward a left side from the position at the steering angle of 0 degrees is indicated by a line on the left side relative to the steering angle of 0 degrees and on the lower side relative to the graph G1.

That is, in FIG. 16, the steering load Q at the time when the steering wheel 11 (the steering shaft 12) is steered toward the right side is positive, and the steering load Q at the time when the steering wheel 11 (the steering shaft 12) is steered toward the left side is negative. Further, as the vehicle speed V is higher, the steering load Q is smaller, and as the vehicle speed V is lower, the steering load Q is larger.

Subsequently, a steering load Q1 (−Q1) is determined from an intersection point between the prescribed steering angle θ1 (±40 degrees) set as described above and the graph G1 (see FIG. 16). At this time, the steering load Q1 (−Q1) is a value corresponding to the prescribed value P1 of the power P transmitted between the first screw groove 21b1 and the second screw groove 33a1. As described above, the prescribed diameter difference α between the diameter of the large-diameter balls 38a and the diameter of the small-diameter balls 38b is determined by experiment or the like based on the steering load Q1 (−Q1).

That is, a diameter difference that allows the first screw groove 21b1 and the second screw groove 33a1 to be displaced by the steering load Q1 (−Q1) so as to contact the small-diameter balls 38b when the steering load Q1 (−Q1) is transmitted between the first screw groove 21b1 and the second screw groove 33a1 is determined and set as the prescribed diameter difference α.

In a state where the prescribed diameter difference α is set as described above, when the steering angle θ of the steering wheel 11 exceeds ±40 degrees and the steering load Q exceeds the steering load Q1 (−Q1), at least one member among the first screw groove 21b1, the second screw groove 33a1, and the large-diameter balls 38a receiving a load between the first screw groove 21b1 (the rack shaft 21) and the second screw groove 33a1 (the ball nut 33a) is further elastically deformed. Then, the groove surfaces of the first screw groove 21b1 and the groove surface of the second screw groove 33a1 are displaced in directions toward the small-diameter balls 38b so as to reduce the prescribed diameter difference α between the diameters of the large-diameter balls 38a and the small-diameter balls 38b, and contact the small-diameter balls 38b, and thus, the small-diameter balls 38b are held between the groove surfaces of the first screw groove 21b1 and the groove surface of the second screw groove 33a1 (see FIG. 15).

Thus, the load applied between the first screw groove 21b1 (the rack shaft 21) and the second screw groove 33a1 (the ball nut 33a) is shared by the small-diameter balls 38b and the large-diameter balls 38a. This accordingly improves durability for strength and durability against abrasion of the balls 38 (the small-diameter balls 38b and the large-diameter balls 38a). Therefore, if the steering wheel 11 is steered such that the steering angle exceeds the prescribed steering angle θ, which is ±40 degrees, the balls 38 (particularly, the large-diameter balls 38a) are protected well.

Note that, in a case where the above-described condition is applied, the following state is achieved at the time when the vehicle is stopped. That is, when the above-described condition is applied to the relationship between the steering angle θ and the steering load Q of the steering wheel 11 during the vehicle stop, which is indicated by the graph G2, the small-diameter balls 38b receive a load caused due to the transmission of the power P, together with the large-diameter balls 38a in a substantially entire region of the steering angle θ. That is, in a case where steering without driving is performed in a state where ball clogging is caused in the balls 38, the steering load Q of the steering wheel 11 becomes heavy in the substantially entire region of the steering angle θ due to the influence of the ball clogging. However, if this point is permitted because it is natural that the steering becomes heavy at the time when the steering wheel 11 is steered without driving, this condition is established.

Note that, in the embodiment, the prescribed diameter difference α is set based on the graph G1, which indicates the relationship between the steering angle θ and the steering load Q of the steering wheel 11 during the vehicle travel at a high speed. However, the disclosure is not limited to this embodiment. In Modification 1, the prescribed diameter difference α may be set based on the graph G2, which indicates the relationship between the steering angle θ and the steering load Q of the steering wheel 11 during the vehicle stop.

In Modification 1, it is assumed that the vehicle stops after ball clogging is caused during vehicle travel, and the steering wheel 11 (the steering shaft 12) is steered without driving in a state where the vehicle stops. That is, in Modification 1, a prescribed peripheral velocity X of the rotation of the steered wheels 26, that is, a vehicle speed X of the vehicle is 0 km/h.

In Modification 1, first, the range which is defined by the prescribed steering angle θ1 of the steering wheel 11 (the steering shaft 12) and in which the power P is transmitted between the first screw groove 21b1 (the rack shaft 21) and the second screw groove 33a1 (the ball nut 33a) by only the large-diameter balls 38a is set, as in the above embodiment. The prescribed steering angle θ1 may be set to any degrees, but the following description is made on the assumption that the steering angle θ is set to ±40 degrees as an example, similarly to the embodiment. Further, the steering load Q of the steering wheel 11 at the time when the steering angle θ of the steering wheel 11 is ±40 degrees is assumed to be Q2 (−Q2) from the graph G2 in FIG. 16.

When the steering angle θ of the steering wheel 11 exceeds ±40 degrees and the steering load Q exceeds the steering load Q2 (−Q2), at least one member among the large-diameter balls 38a, the first screw groove 21b1, and the second screw groove 33a1 is further elastically deformed, and a groove surface each of the first screw groove 21b1 and the second screw groove 33a1 is displaced by a prescribed dimension (α/2) so as to contact the small-diameter balls 38b, and thus, the small-diameter balls 38b are held between the first screw groove 21b1 and the second screw groove 33a1. Note that the prescribed diameter difference α between the large-diameter balls 38a and the small-diameter balls 38b is set by a method similar to that in the above embodiment.

With the setting condition, in a case where the vehicle speed is 0 km/h, when the steering angle θ is within the range defined by ±40 degrees, the power P can be transmitted between the first screw groove 21b1 (the rack shaft 21) and the second screw groove 33a1 (the ball nut 33a) by only the large-diameter balls 38a.

Thus, each small-diameter ball 38b can rotate between its adjacent large-diameter balls 38a without being restricted by the first screw groove 21b1 and the second screw groove 33a1. Accordingly, as described above, the small-diameter ball 38b does not disturb the rotation of the large-diameter balls 38a and appropriately restrains the steering load Q of the steering wheel 11 from being heavy.

When the steering angle of the steering wheel 11 exceeds ±40 degrees and the steering load Q exceeds the steering load Q2 (−Q2), at least one member among the large-diameter balls 38a, the first screw groove 21b1, the second screw groove 33a1 is further elastically deformed as described above. Then, the groove surfaces of the first screw groove 21b1 and the second screw groove 33a1 are displaced toward the small-diameter balls 38b so as to reduce the prescribed diameter difference α between the diameters of the large-diameter balls 38a and the small-diameter balls 38b and contact the small-diameter balls 38b, and thus, the small-diameter balls 38b are held between the groove surfaces of the first screw groove 21b1 and the second screw groove 33a1.

Thus, the small-diameter balls 38b as well as the large-diameter balls 38a receive a load generated due to the transmission of the power P between the rack shaft 21 (the first screw groove 21b1) and the ball nut 33a (the second screw groove 33a1), thereby improving reliability relating to strength and abrasion of the balls 38 (the small-diameter balls 38b and the large-diameter balls 38a). If the steering wheel 11 is steered such that the steering angle exceeds ±40 degrees, the large-diameter balls 38a are protected well.

Further, in Modification 2, in a case where, based on the graph G1 of FIG. 16, the peripheral velocity of the steered wheels 26 in G1 is a reference peripheral velocity (in other words, a setting peripheral velocity) V (e.g., the reference peripheral velocity (vehicle speed) V=80 km/h), a graph G3 at a prescribed peripheral velocity V1 (e.g., the prescribed peripheral velocity V1=100 km/h) higher than the reference peripheral velocity V may be set, and the prescribed diameter difference α between the large-diameter balls 38a and small-diameter balls 38b may be set based on the graph G3. Note that the prescribed steering angle θ1 in this case may be set to any degrees. Even in this case, it is possible to obtain the same effect as the effect obtained in the above embodiment.

Note that, in Modification 2 as well, the prescribed steering angle θ1 of the steering wheel 11, at which the prescribed value P1 of the power P is transmitted between the first screw groove 21b1 (the rack shaft 21) and the second screw groove 33a1 (the ball nut 33a) by only the large-diameter balls 38a, may be set to ±40 degrees, for example. Thus, it is possible to obtain the same effect as the effect obtained in the above embodiment.

Note that, in a case where the condition of Modification 2 is applied, the following state is achieved in the graph G1 (e.g., the reference peripheral velocity V=80 km/h) and the graph G2 (at the time of vehicle stop). That is, in the relationships between the steering angle θ and the steering load Q of the steering wheel 11, which are indicated by the graphs G1, G2, the small-diameter balls 38b as well as the large-diameter balls 38a receive a load caused due to the transmission of the power P in an entire region of the steering angle θ.

That is, when ball clogging is caused in the balls 38, the steering load Q of the steering wheel 11 becomes heavy in the substantially entire region of the steering angle θ. However, from a different viewpoint, the small-diameter balls 38b as well as the large-diameter balls 38a receive the load between the rack shaft 21 (the first screw groove 21b1) and the ball nut 33a (the second screw groove 33a1) in the entire region of the steering angle θ. This accordingly improves the reliability relating to strength and abrasion of the balls 38 (the small-diameter balls 38b and the large-diameter balls 38a).

Further, in Modification 3, in a case where, based on the graph G1 of FIG. 16, the peripheral velocity of the steered wheels 26 in G1 is a reference peripheral velocity V (e.g., the reference peripheral velocity V=80 km/h), for example, a graph G4 at a prescribed peripheral velocity V2 (e.g., the prescribed peripheral velocity V2=30 km/h) lower than the reference peripheral velocity V may be set, and the prescribed diameter difference α between the large-diameter balls 38a and small-diameter balls 38b may be set based on the graph G4.

Note that, also in Modification 3, the prescribed steering angle θ1 of the steering wheel 11, at which the prescribed value P1 of the power P is transmitted between the first screw groove 21b1 (the rack shaft 21) and the second screw groove 33a1 (the ball nut 33a) by only the large-diameter balls 38a, may be ±40 degrees, for example. Thus, it is possible to obtain the same effect as the effect obtained in the above embodiment.

Further, in a case where the condition of Modification 3 is applied, the small-diameter balls 38b as well as the large-diameter balls 38a receive a load between the first screw groove 21b1 (the rack shaft 21) and the second screw groove 33a1 (the ball nut 33a) in a high steering angle region H (see FIG. 16) of the steering angle θ in the graph G1. Therefore, in a case where it is desired that the power P between the rack shaft 21 (the first screw groove 21b1) and the ball nut 33a (the second screw groove 33a1) is transmitted by only the large-diameter balls 38a until the steering angle θ reaches the high steering angle region H in the graph G1 at the reference peripheral velocity V, the prescribed diameter difference α may be set based on the graph at a prescribed peripheral velocity lower than the reference peripheral velocity, as in Modification 3.

Further, in the embodiment, the prescribed diameter difference α is set based on the graph G1 indicative of the relationship between the steering angle θ and the steering load Q of the steering wheel 11 during the vehicle travel at a high speed. However, the disclosure is not limited to this embodiment. In Modification 4, for example, an appropriate value may be selected from values of power input from the steered wheels 26 to the rack shaft 21 in a case where the steered wheels 26 of the traveling vehicle run onto a curb stone, and may be set as a prescribed value P1 transmitted between the first screw groove 21b1 (the rack shaft 21) and the second screw groove 33a1 (the ball nut 33a), so as to set the prescribed diameter difference α.

Further, in the embodiment, the ball screw mechanism 33 is applied to the rack-parallel electric power steering apparatus S1. However, the disclosure is not limited to this embodiment. In another embodiment, the ball screw mechanism 33 may be applied to, for example, a so-called rack-direct electric power steering apparatus in which a rack shaft and a motor are disposed coaxially, as described in Japanese Patent Application Publication No. 2011-105075 A (JP 2011-105075 A). In this case as well, it is expected to obtain an appropriate effect.

As is apparent from the above description, according to the above embodiment, the electric power steering apparatus S1 (the steering apparatus) includes the steering shaft 12; the rack shaft 21 (a steered shaft) supported by the housing 22 so as to be slidable in the axis direction and configured to reciprocate in the axis direction via a rack-and-pinion mechanism in accordance with a steering angle of the steering shaft 12 so as to steer the steered wheels 26; the ball screw mechanism 33 including a rolling element screw portion having the first screw groove 21b1 formed on the outer peripheral surface of the rack shaft 21, the ball nut (a rolling element nut) 33a having the second screw groove 33a1 formed on the inner peripheral surface of the ball nut 33a so as to correspond to the first screw groove 21b1, the connecting member 37 including the connecting passage 51 connected to both ends of the spiral raceway 39 formed between the first screw groove 21b1 and the second screw groove 33a1, so as to form the continuous circulation passage 50 together with the spiral raceway 39, and the plurality of balls 38 (rolling elements) arranged and accommodated in the circulation passage 50; and the motor M fixed to the housing 22 and configured to rotate the ball nut (the rolling element nut) 33a around the axis of the rack shaft 21.

The plurality of balls 38 (rolling elements) includes the large-diameter balls 38a (large-diameter rolling elements), and the small-diameter balls 38b (small-diameter rolling elements) having a diameter smaller than that of the large-diameter balls 38a by the prescribed diameter difference α, each of the small-diameter balls 38b being disposed between the large-diameter balls 38a. When a magnitude of the power P transmitted between the first screw groove 21b1 and the second screw groove 33a1 is the prescribed value P1 or less, only the large-diameter balls 38a transmit the power P between the first screw groove 21b1 and the second screw groove 33a1 in the spiral raceway 39. Further, the prescribed diameter difference α is set such that, when the power P transmitted between the first screw groove 21b1 and the second screw groove 33a1 exceeds the prescribed value P1, both the large-diameter balls 38a and the small-diameter balls 38b transmit the power P between the first screw groove 21b1 and the second screw groove 33a1 in the spiral raceway 39.

Thus, in the spiral raceway 39, the small-diameter balls 38b (the small-diameter rolling elements) which have a diameter smaller than that of the large-diameter balls 38a and which are rotatable without restriction from the spiral raceway 39 are each disposed between the large-diameter balls 38a. Therefore, when the power P transmitted between the first screw groove 21b1 and the second screw groove 33a1 constituting the spiral raceway 39 is the prescribed value P1 or less, only the large-diameter balls 38a perform power transmission. Accordingly, at least at the contact portion T2 where the large-diameter ball 38a contacts the small-diameter ball 38b, the small-diameter ball 38b can rotate in a rotation direction opposite to a rotation direction of the large-diameter ball 38a, due to the rotation of the large-diameter ball 38a. In other words, at the contact portion T2 between the large-diameter ball 38a and the small-diameter ball 38b, the large-diameter ball 38a and the small-diameter ball 38b are movable relative to each other in the same direction. Accordingly, friction due to the relative movement between the large-diameter ball 38a and the small-diameter ball 38b is not caused at the contact portion T2 between the large-diameter ball 38a and the small-diameter ball 38b, and the steering load Q of the steering wheel 11 (the steering shaft 12) does not increase.

Further, in a case where it is necessary to transmit power larger than the prescribed value P1 between the first screw groove 21b1 and the second screw groove 33a1 constituting the spiral raceway 39, at least one member among the first screw groove 21b1, the second screw groove 33a1, and the large-diameter balls 38a (the large-diameter rolling elements) that contact the first screw groove 21b1 and the second screw groove 33a1 is elastically deformed, and thus, a clearance between the first screw groove 21b1 and the second screw groove 33a1 is reduced. Thus, in the spiral raceway 39, the first screw groove 21b1 and the second screw groove 33a1 contact the small-diameter balls 38b (the small-diameter rolling elements), so that the power transmission between the first screw groove 21b1 and the second screw groove 33a1 can be performed by both of the large-diameter balls 38a and the small-diameter balls 38b. This improves the durability of the rolling elements.

Further, according to the embodiment, only the large-diameter balls 38a (the large-diameter rolling elements) transmit the power, when the steering shaft 12 is steered such that the steering angle is within the range defined by the prescribed steering angle θ1 in a state where the steered wheels 26 rotate at the prescribed peripheral velocity X (=the vehicle speed X). Further, the large-diameter balls 38a and the small-diameter balls 38b transmit the power, when the steering shaft 12 is steered such that the steering angle exceeds the prescribed steering angle θ in the state where the steered wheels 26 rotate at the prescribed peripheral velocity X (=the vehicle speed X).

Thus, in a case where the steered wheels 26 rotate at the prescribed peripheral velocity X (=the vehicle speed X) and the steering shaft 12 (the steering wheel 11) is steered such that the steering angle is within the range defined by the prescribed steering angle θ1, that is, in a case where the steering angle of the steering shaft 12 is small and therefore the power transmitted between the first screw groove 21b1 and the second screw groove 33a1 constituting the spiral raceway 39 is relatively small and is the prescribed value P1 or less, a state where the small-diameter balls 38b (the small-diameter rolling elements) are rotatable is maintained. That is, only the large-diameter balls 38a (the large-diameter rolling elements) contact the first screw groove 21b1 and the second screw groove 33a1 and transmit the power between the first screw groove 21b1 and the second screw groove 33a1.

Thus, the small-diameter balls 38b do not disturb the rotation of the large-diameter balls 38a with which the small-diameter balls 38b make contact, and thus, the small-diameter balls 38b and the large-diameter balls 38a smoothly rotate relative to each other between the first screw groove 21b1 (the ball screw portion 21b) and the second screw groove 33a1 (the ball nut 33a). Accordingly, even if ball clogging occurs and the balls 38 come into contact with each other, the small-diameter balls 38b and the large-diameter balls 38a smoothly rotate relative to each other between the rolling element screw portion 21b and the ball nut 33a (the rolling element nut).

Further, in a case where the steered wheels 26 rotate at the prescribed peripheral velocity X (=the vehicle speed X) and the steering shaft 12 is steered such that the steering angle exceeds the prescribed steering angle θ, that is, in a case where the steering angle of the steering shaft 12 is large and therefore it is necessary to transmit power equal to or larger than the prescribed value P1 between the first screw groove 21b1 and the second screw groove 33a1 constituting the spiral raceway 39, at least one member among the first screw groove 21b1, the second screw groove 33a1, and the large-diameter balls 38a (the large-diameter rolling elements) that contact the first screw groove 21b1 and the second screw groove 33a1 is elastically deformed, and thus, the clearance (the prescribed diameter difference α) between the first screw groove 21b1 and the second screw groove 33a1 is reduced. Then, the first screw groove 21b1 and the second screw groove 33a1 contact the small-diameter balls 38b (the small-diameter rolling elements). Thus, the power transmission between the first screw groove 21b1 and the second screw groove 33a1 can be performed by both of the large-diameter balls 38a (the large-diameter rolling elements) and the small-diameter balls 38b (the small-diameter rolling elements), so that durability in the transmission of a large power can be secured.

The pitch circle inside diameter of the second screw groove 33a1 of the ball nut 33a is formed to be larger at the axial end of the ball nut 33a than at the central part of the ball nut 33a in the axis direction, and the plurality of balls 38 includes the large-diameter balls 38a (the large-diameter rolling elements), and the small-diameter balls 38b (the small-diameter rolling elements) having a diameter smaller than that of the large-diameter balls 38a by the prescribed diameter difference α, each of the small-diameter balls 38b being disposed between the large-diameter balls 38a. The prescribed diameter difference α is set such that when the magnitude of the power P transmitted between the first screw groove 21b1 and the second screw groove 33a1 is the prescribed value P1 or less, only the large-diameter balls 38a in the spiral raceway 39 transmit the power P between the first screw groove 21b1 and the second screw groove 33a1, and when the magnitude of the power P transmitted between the first screw groove 21b1 and the second screw groove 33a1 exceeds the prescribed value P1, both the large-diameter balls 38a and the small-diameter balls 38b in the spiral raceway 39 transmit the power P between the first screw groove 21b1 and the second screw groove 33a1.

In the electric power steering apparatus S1 (the steering apparatus) configured as described above, the pitch circle inside diameter of the second screw groove 33a1 of the ball nut 33a (the rolling element nut) is formed to be larger at the axial end than at the central part in the axis direction, and thus, a radial clearance between the first screw groove 21b1 and the second screw groove 33a1 is small at the central part and is large at both ends.

Thus, the plurality of balls 38 (the rolling elements) arranged and accommodated in the second screw groove 33a1 of the ball nut 33a easily moves from the central part where the radial clearance between the first screw groove 21b1 and the second screw groove 33a1 is small toward both ends where the radial clearance is large. Further, since the radial clearance between the second screw groove 33a1 and the first screw groove 21b1 is large at both ends in the second screw groove 33a1, the plurality of balls 38 further easily falls downward in a gravitational direction. This increases a density of the balls 38 on a lower side at both ends of the second screw groove 33a1, which may cause a so-called ball clogging state in which adjacent balls 38 contact each other.

However, in the spiral raceway 39, each small-diameter ball 38b (the small-diameter rolling element) is disposed between the large-diameter balls 38a (the large-diameter rolling elements). The small-diameter ball 38b has a diameter smaller than that of the large-diameter ball 38a by the prescribed diameter difference α so as to be rotatable without receiving any restriction from the first screw groove 21b1 and the second screw groove 33a1 constituting the spiral raceway 39. Therefore, in a case where the rack shaft 21 is to move in the axis direction in the ball clogging state, the small-diameter ball 38b can rotate in a rotation direction opposite to a rotation direction of the large-diameter ball 38a due to the rotation of the large-diameter ball 38a at least at a part where the large-diameter ball 38a contacts the small-diameter ball 38b. Accordingly, at the contact portion between the large-diameter ball 38a and the small-diameter ball 38b, friction due to the relative movement between the large-diameter ball 38a and the small-diameter ball 38b is not caused.

At this time, when the power P transmitted between the first screw groove 21b1 and the second screw groove 33a1 constituting the spiral raceway 39 is the prescribed value P1 or less, the state where the small-diameter balls 38b are freely rotatable is maintained as described above. That is, only the large-diameter balls 38a contact the first screw groove 21b1 and the second screw groove 33a1 and transmit the power P between the first screw groove 21b1 and the second screw groove 33a1. Thus, it is possible to achieve smooth relative rotation between the ball screw portion and the ball nut 33a without disturbing the rotation of the large-diameter balls 38a with which the small-diameter ball 38b makes contact. Thus, the steering load Q of the steering shaft 12 does not increase.

Further, in the electric power steering apparatus S1 (the steering apparatus) configured as described above, when the rolling element nut 33a is urged in a prescribed direction due to a tensile force of the toothed belt 35a included in the belt transmission mechanism 35, unevenness may be caused in a direction of a tensile force. Accordingly, unevenness is also caused in the clearance (gap) between the first screw groove 21b1 and the second screw groove 33a1, namely, the radial clearance in the spiral raceway 39. This may cause a narrower part and a wider part in a passage for the rolling elements 38 in the spiral raceway 39. In such a state, the rolling elements may be further pushed toward the wider part of the passage from the narrower part of the passage, which may cause the ball clogging state in which adjacent rolling elements 38 contact each other in the wider part. However, even in such a case, by employing the ball screw mechanism 33 of the disclosure, it is possible to more effectively restrain an increase of the steering load.

Further, in other words, as is apparent from the above description, according to the above embodiment, the electric power steering apparatus S1 (the steering apparatus) includes the rack shaft 21 (the steered shaft) supported by the housing 22 so as to be slidable in the axis direction and configured to reciprocate in the axis direction so as to steer the steered wheels 26; the ball screw mechanism 33 including the rolling element screw portion having the first screw groove 21b1 formed on the outer peripheral surface of the rack shaft 21, the ball nut 33a (the rolling element nut) having the second screw groove 33a1 formed on the inner peripheral surface of the ball nut 33a so as to correspond to the first screw groove 21b1, the connecting member 37 including the connecting passage 51 connected to both ends of the spiral raceway 39 formed between the first screw groove 21b1 and the second screw groove 33a1 so as to form the continuous circulation passage 50 together with the spiral raceway 39, and the plurality of balls 38 (the rolling elements) arranged and accommodated in the circulation passage 50; the motor M fixed to the housing 22 and including the output shaft 32b offset from the rack shaft 21; and the belt transmission mechanism 35 including the toothed drive pulley 32a provided on the output shaft 32b so as to be rotatable integrally with the output shaft 32b, the toothed driven pulley 34 integrally provided on the ball nut 33a, and the toothed belt 35a that transmits a driving force between the drive pulley 32a and the driven pulley 34.

The plurality of balls 38 includes the large-diameter balls 38a (the large-diameter rolling elements), and the small-diameter balls 38b (the small-diameter rolling elements) having a diameter smaller than that of the large-diameter balls 38a by a prescribed diameter difference, each of the small-diameter balls 38b being disposed between the large-diameter balls 38a. Further, a radial clearance in the spiral raceway 39 varies in the circumferential direction depending on a direction of a tensile force of the toothed belt 35a. The prescribed diameter difference α is set such that when the magnitude of the power P transmitted between the first screw groove 21b and the second screw groove 33a1 is the prescribed value P1 or less, only the large-diameter balls 38a (the large-diameter rolling elements) in the spiral raceway 39 transmit the power P between the first screw groove 21b1 and the second screw groove 33a1, and when the magnitude of the power P transmitted between the first screw groove 21b1 and the second screw groove 33a1 exceeds the prescribed value P1, both the large-diameter balls 38a and the small-diameter balls 38b in the spiral raceway 39 transmit the power P between the first screw groove 21b1 and the second screw groove 33a1.

In the electric power steering apparatus S1 (the steering apparatus) configured as described above, when the rolling element nut 33a is urged in a prescribed direction due to a tensile force of the toothed belt 35a, unevenness may be caused. This also causes unevenness in a clearance β (gap) between the first screw groove 21b1 and the second screw groove 33a1, namely, in the radial clearance β of the spiral raceway 39. This may cause the clearance β1 of a narrower part and the clearance β2 of a wider part in a passage for the rolling element 38 in the spiral raceway 39. In such a state, the rolling elements are pushed from the narrower part of the passage toward the wider part of the passage, which may cause a ball clogging state in which adjacent rolling elements 38 contact each other in the wider part.

However, in the spiral raceway 39, the small-diameter balls 38b that have a diameter smaller than that of the large-diameter balls 38a by the prescribed diameter difference α and therefore are rotatable without restriction from the spiral raceway 39 are each disposed between the large-diameter balls 38a. In the configuration, when the power P transmitted between the first screw groove 21b1 and the second screw groove 33a1 constituting the spiral raceway 39 is the prescribed value P1 or less, only the large-diameter balls 38a contact the first screw groove 21b1 and the second screw groove 33a1 and transmit the power P between the first screw groove 21b1 and the second screw groove 33a1. Thus, the small-diameter ball 38b can rotate in a rotation direction opposite to a rotation direction of the large-diameter ball 38a, due to the rotation of the large-diameter ball 38a at least at a portion where the large-diameter ball 38a contacts the small-diameter ball 38b. Accordingly, at the contact portion between the large-diameter ball 38a and the small-diameter ball 38b, friction due to the relative movement between the large-diameter ball 38a and the small-diameter ball 38b hardly occurs. That is, it is possible to achieve smooth relative rotation between the ball screw portion and the ball nut 33a without disturbing the rotation of the large-diameter balls 38a with which the small-diameter ball 38b makes contact. Thus, the steering load of the steering shaft 12 does not increase.

Further, in a case where the power P transmitted between the first screw groove 21b1 and the second screw groove 33a1 constituting the spiral raceway 39 exceeds the prescribed value P1, at least one member among the first screw groove 21b1, the second screw groove 33a1, and the large-diameter balls 38a that contact the first screw groove 21b1 and the second screw groove 33a1 is elastically deformed, and thus, a clearance between the first screw groove 21b1 and the second screw groove 33a1 is reduced. Thus, in the spiral raceway 39, the first screw groove 21b1 and the second screw groove 33a1 are displaced so as to contact the small-diameter balls 38b (the small-diameter rolling elements). Thus, the transmission of the power P between the first screw groove 21b1 and the second screw groove 33a1 can be performed by both of the large-diameter balls 38a (the large-diameter rolling elements) and the small-diameter balls 38b, thereby improving the durability of the balls 38 (the rolling elements).

Further, in the above embodiment, the ball screw mechanism 33 is accommodated in the second steering assist housing 232 of the housing 22, and one end of the ball nut 33a (the rolling element nut) is supported by the second steering assist housing 232 of the housing 22, and the other end thereof is provided with the driven pulley 34.

That is, the ball nut 33a is supported by the second steering assist housing 232 in a cantilever state. In this state, the toothed driven pulley 34 is fixed to the other end, and the toothed belt 35a is disposed around the driven pulley 34 and the outer periphery of the drive pulley 32a in a state where the toothed belt 35a has a prescribed tensile force. Therefore, the toothed belt 35a pulls downward the other end of the ball nut 33a, one end of the ball nut 33a being supported in a cantilever state.

As a result, the other end of the ball nut 33a is displaced downward with the one end serving as a rotation center. At this time, in the spiral raceway 39 in the ball screw mechanism 33, the radial clearance β of the spiral raceway 39, that is, the clearance β between the first screw groove 21b1 and the second screw groove 33a1 becomes uneven as illustrated in FIG. 12 such that the clearance on the upper side in the spiral raceway 39 is narrowed to become the clearance β1, and the clearance on the lower side in the spiral raceway 39 is widened to become the clearance β2.

Thus, the balls 38 in the spiral raceway 39 are pushed out from the upper side toward the lower side, which may cause a ball clogging state where the large-diameter ball 38a and the small-diameter ball 38b, which are adjacent to each other, contact each other on the lower side in the spiral raceway 39. Note that, in the embodiment, since the clearance on the upper side (directly above) in the spiral raceway 39 is narrowed to become the clearance 131 and the clearance on the lower side (directly below) in the spiral raceway 39 is widened to become the clearance 132, the balls 38 easily fall downward in the spiral raceway 39 due to the gravity, and thus, the ball clogging state is more easily caused. Thus, since the disclosure is applied to the embodiment in which the balls 38 are easily brought to the ball clogging state, a significant effect can be obtained.

Further, in the embodiment, the spiral raceway 39 of the circulation passage 50 of the ball screw mechanism 33 is constituted by a multi-row single-circulation passage. In the multi-row single-circulation passage, two (or more) single-threaded-spiral passages a, b, which are wound, are provided in the axis direction. Therefore, more balls (rolling elements) are used in the circulation passage as compared to a circulation passage constituted by a single-row single-circulation passage, for example. Accordingly, since the number of balls used in one circulation passage is larger in the multi-row single-circulation passage, an amount, by which the steering load Q increases when ball clogging occurs, is larger in the multi-row single-circulation passage. Consequently, when the ball screw mechanism 33 of the disclosure is applied to the multi-row single-circulation passage, a larger effect can be obtained as compared to a case where the ball screw mechanism 33 of the disclosure is applied to the single-row single-circulation passage.

Note that, in the above embodiment, the large-diameter balls 38a are made of an iron-based material. However, the disclosure is not limited to this embodiment. The large-diameter balls 38a may be made of any material, provided that the large-diameter balls 38a have a prescribed strength and a Young's modulus that makes it possible to provide the prescribed diameter difference α with respect to the small-diameter balls 38b. Further, the small-diameter balls 38b may be made of a material that hardly deforms, such as ceramic, provided that the small-diameter balls 38b have a prescribed strength, for example. Further, the small-diameter balls 38b may be made of resin or the like.

Further, in the above embodiment, the large-diameter balls 38a and the small-diameter balls 38b are arranged alternately one by one in the spiral raceway 39. However, the disclosure is not limited to this embodiment, and each small-diameter ball 38b may be disposed between sets of two large-diameter balls 38a. Further, each small-diameter ball 38b may be disposed between sets of three to N pieces of large-diameter balls 38a.

In this case, at the time when ball clogging of the balls 38 occurs, at a portion where the large-diameter balls 38a contact each other, their rotations are disturbed by friction that is caused. This may increase the steering load Q of the steering wheel 11, as in the related art. However, at least the small-diameter balls 38b can freely rotate between their adjacent large-diameter balls 38a, as in the above embodiment. Accordingly, since the small-diameter balls 38b are provided, it is possible to restrain the increase of the steering load Q of the steering wheel 11, which is caused due to the ball clogging.

Further, in the above embodiment, the circulation passage 50 is constituted by the multi-row single-circulation passage formed of the multi-row spiral raceway 39 and one connecting passage 51. However, the disclosure is not limited to this embodiment. In another embodiment, a circulation passage as disclosed in Japanese Patent Application Publication No. 2016-020725 (JP 2016-020725 A) may be formed of a single-row single circulation passage constituted by a single-row spiral raceway and one connecting passage. In this case, a prescribed number of single-row single-circulation passages may be provided in the axis direction. In this case as well, it is expected to obtain an appropriate effect.

Further, in the above embodiment, the prescribed steering angle of the steering wheel 11 (the steering shaft 12) at a prescribed vehicle speed V (a prescribed peripheral velocity V of the steered wheels) is ±40 degrees, but the disclosure is not limited to this embodiment. The prescribed steering angle may be set to any angle. With this configuration, it is expected to obtain an effect corresponding to the prescribed steering angle that is set.

Further, in the above embodiment, the connecting passage 51 of the connecting member 37 is formed inside the ball nut 33a. However, the disclosure is not limited to this embodiment, and the connecting passage may be constituted by a known return-tube system in which a tube or the like is attached to an outer side of the ball nut 33a. Further, the connecting passage may be constituted by an internal-deflector system in which a connecting passage is constituted with the use of a known internal-deflector. Furthermore, the connecting passage may be also constituted by a known end-cap system, a guide-plate system, and the like. In any case, it is expected to obtain the same effect as that obtained in the above embodiment.

Note that, in the above embodiment, the drive pulley 32a of the motor M is provided below (under), in the gravitational direction, the driven pulley 34 provided on the other end of the ball nut 33a, one end of the ball nut 33a being supported in a cantilever manner. Accordingly, the toothed belt 35a disposed around the drive pulley 32a and the driven pulley 34 pulls (urges) downward the other end of the ball nut 33a with a prescribed tensile force. Thus, the clearance β between the first screw groove 21b1 and the second screw groove 33a1 becomes uneven between upper and lower sides such that the clearance (gap) on the upper side is narrowed to become the clearance β1 and the clearance (gap) on the lower side is widened to become the clearance β2.

However, the disclosure is not limited to this embodiment, and the drive pulley 32a of the motor M may be disposed at any place in the circumferential direction around a rotation axis of the driven pulley 34. Thus, the toothed belt 35a pulls the other end of the ball nut 33a toward the drive pulley 32a with a prescribed tensile force in accordance with a position where the drive pulley 32a is disposed. Then, the ball nut 33a is displaced in a direction where the tensile force is applied, so that the clearance between the first screw groove 21b1 and the second screw groove 33a1 is made uneven. At this time, a position where the clearance between the first screw groove 21b1 and the second screw groove 33a1 is largest is a position where an imaginary line that connects a rotation axis of the drive pulley 32a to the rotation axis of the driven pulley 34 intersects with the spiral raceway 39. Further, a position where the clearance β between the first screw groove 21b1 and the second screw groove 33a1 is smallest is a position displaced around the rotation axis of the driven pulley 34 by 180° from the position where the clearance β is largest. Even with the configuration, it is possible to obtain the same operations as those obtained in the above embodiment, and an appropriate effect.

What is claimed is:

1. A steering apparatus comprising:
   a steering shaft;
   a steered shaft supported by a housing so as to be slidable in an axis direction of the steered shaft and configured to reciprocate in the axis direction via a rack-and-pinion mechanism in accordance with a steering angle of the steering shaft so as to steer steered wheels;
   a ball screw mechanism including a rolling element screw portion having a first screw groove formed on an outer peripheral surface of the steered shaft, a rolling element nut having a second screw groove formed on an inner peripheral surface of the rolling element nut so as to correspond to the first screw groove, a connecting member including a connecting passage connected to both ends of a spiral raceway formed between the first screw groove and the second screw groove so as to form a circulation passage together with the spiral raceway, and a plurality of rolling elements arranged and accommodated in the circulation passage, the circulation passage being continuous; and
   a motor fixed to the housing so as to rotate the rolling element nut around an axis of the steered shaft, wherein
   the plurality of rolling elements includes large-diameter rolling elements and small-diameter rolling elements having a diameter smaller than that of the large-diameter rolling elements by a prescribed diameter difference, each of the small-diameter rolling elements being disposed between the large-diameter rolling elements, and
   the prescribed diameter difference is set such that when a magnitude of power transmitted between the first screw groove and the second screw groove is a prescribed value or less, only the large-diameter rolling elements transmit the power between the first screw groove and the second screw groove in the spiral raceway, and when the magnitude of the power transmitted between the first screw groove and the second screw groove exceeds the prescribed value, both the large-diameter rolling elements and the small-diameter rolling elements transmit the power between the first screw groove and the second screw groove in the spiral raceway.

2. The steering apparatus according to claim 1, wherein:
   only the large-diameter rolling elements transmit the power, when the steering shaft is steered such that the steering angle is within a range defined by a prescribed steering angle in a state where the steered wheels rotate at a prescribed peripheral velocity; and
   the large-diameter rolling elements and the small-diameter rolling elements transmit the power, when the steering shaft is steered such that the steering angle exceeds the prescribed steering angle in the state where the steered wheels rotate at the prescribed peripheral velocity.

3. The steering apparatus according to claim 2, wherein:
   the prescribed peripheral velocity is higher than a reference peripheral velocity; and
   the prescribed steering angle is ±40 degrees.

4. The steering apparatus according to claim 2, wherein:
   the prescribed peripheral velocity is lower than a reference peripheral velocity; and
   the prescribed steering angle is ±40 degrees.

5. The steering apparatus according to claim 1, wherein:
   the motor includes an output shaft offset from the steered shaft;
   the steering apparatus further includes a belt transmission mechanism including a toothed drive pulley provided on the output shaft so as to be rotatable integrally with the output shaft, a toothed driven pulley integrally provided on the rolling element nut, and a toothed belt that transmits a driving force between the drive pulley and the driven pulley; and
   a radial clearance in the spiral raceway varies in a circumferential direction depending on a direction of a tensile force of the toothed belt.

6. The steering apparatus according to claim 5, wherein:
   the ball screw mechanism is accommodated in the housing; and
   the rolling element nut is configured such that one end thereof is supported by the housing, and another end thereof is provided with the driven pulley.

7. The steering apparatus according to claim 1, wherein a pitch circle inside diameter of the second screw groove of the rolling element nut is larger at an end of the rolling element nut in the axis direction than at a central part of the rolling element nut in the axis direction.

8. The steering apparatus according to claim 1, wherein the spiral raceway of the circulation passage in the ball screw mechanism is formed such that a plurality of single-threaded-spiral passages is wound around the axis.

* * * * *